United States Patent
Nishina et al.

(10) Patent No.: US 10,921,520 B2
(45) Date of Patent: Feb. 16, 2021

(54) FUSION SPLICING SYSTEM, FUSION SPLICER AND METHOD OF DETERMINING ROTATION ANGLE OF OPTICAL FIBER

(71) Applicant: FURUKAWA ELECTRIC CO., LTD., Tokyo (JP)

(72) Inventors: Jun Nishina, Tokyo (JP); Hideaki Hosoi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/529,035

(22) Filed: Aug. 1, 2019

(65) Prior Publication Data

US 2020/0064549 A1 Feb. 27, 2020

(30) Foreign Application Priority Data

Aug. 2, 2018 (JP) .................................. 2018-146081

(51) Int. Cl.
*G02B 6/25* (2006.01)
*G02B 6/00* (2006.01)
(Continued)

(52) U.S. Cl.
CPC .......... *G02B 6/2555* (2013.01); *B23K 26/032* (2013.01); *G01N 21/6447* (2013.01);
(Continued)

(58) Field of Classification Search
CPC ................................ G02B 6/25; G02B 6/2555
(Continued)

(56) References Cited

U.S. PATENT DOCUMENTS

| | | | | |
|---|---|---|---|---|
| 4,878,933 A | * | 11/1989 | Yamada | G02B 6/2551 65/485 |
| 6,966,708 B2 | | 11/2005 | Hattori | |
| 2004/0047572 A1 | * | 3/2004 | Hattori | G02B 6/2555 385/96 |
| 2005/0254754 A1 | * | 11/2005 | Huang | G02B 6/2551 385/52 |
| 2009/0010601 A1 | * | 1/2009 | Huang | G02B 6/2551 385/97 |

(Continued)

FOREIGN PATENT DOCUMENTS

| | | |
|---|---|---|
| JP | H 07-287753 A | 10/1995 |
| JP | 2002-169050 A | 6/2002 |

(Continued)

OTHER PUBLICATIONS

Japanese Office Action dated Dec. 8, 2020 in Japanese Patent Application No. 2018-146081, with English translation thereof, 5 pages.

*Primary Examiner* — Kaveh C Kianni
(74) *Attorney, Agent, or Firm* — Oblon, McClelland, Maier & Neustadt, L.L.P.

(57) ABSTRACT

Brightness profile data having a number of dimensions is extracted based on image data in a radial direction of an optical fiber, the brightness profile data representing features for each rotation angle of the optical fiber. Machine learning uses training data to create a prediction model that based on the brightness profile data determines a rotation angle of each pair of optical fibers is. The pair of optical fibers are rotated to the determined rotation angle and then fusion spliced. The training data indicates a correspondence relationship between the rotation angle of the optical fiber and brightness profile in the radial direction for each rotation angle of the optical fiber. The prediction model can determine a rotation angle of an arbitrary optical fiber based on brightness profile data of the arbitrary optical fiber.

6 Claims, 16 Drawing Sheets

(51) Int. Cl.
   *G02B 6/255*   (2006.01)
   *G01N 21/64*   (2006.01)
   *G06N 20/00*   (2019.01)
   *B23K 26/03*   (2006.01)
   *G06N 3/08*    (2006.01)

(52) U.S. Cl.
   CPC ............. *G02B 6/2553* (2013.01); *G06N 3/08* (2013.01); *G06N 20/00* (2019.01)

(58) Field of Classification Search
   USPC ........................................................ 385/129
   See application file for complete search history.

(56) References Cited

U.S. PATENT DOCUMENTS

| | | | |
|---|---|---|---|
| 2013/0236147 A1* | 9/2013 | Huang | G02B 6/2551 385/97 |
| 2014/0036256 A1* | 2/2014 | Takahashi | G02B 6/2553 356/73.1 |
| 2016/0178439 A1* | 6/2016 | Freudiger | G01N 15/1434 356/301 |
| 2018/0137336 A1 | 5/2018 | Shoda et al. | |

FOREIGN PATENT DOCUMENTS

| | | |
|---|---|---|
| JP | 2005-195399 A | 7/2005 |
| JP | 2010-128290 A | 6/2010 |
| JP | 2018-081404 A | 5/2018 |
| WO | 2005/045495 | 5/2005 |

\* cited by examiner

FIG.3

| FUNCTIONAL UNIT OF FUSION SPLICER | MICROSCOPE UNIT | AXIS ALIGNING MECHANISM | HEATING DEVICE | FEEDING MECHANISM |
|---|---|---|---|---|
| PARAMETER | OPTICAL FIBER DIAMETER | TRANSMISSION LIGHT WAVELENGTH | INITIAL HEATING TEMPERATURE | FEEDING START TIME |
| | OPTICAL FIBER CORE DIAMETER | OPTICAL FIBER CROSS-SECTIONAL STRUCTURE | MOLDING HEATING TEMPERATURE | FEEDING DISTANCE |
| | OPTICAL FIBER CROSS-SECTIONAL STRUCTURE | CENTER OFFSET | HEATING TIME | FEEDING SPEED |
| | | | PREHEATING TEMPERATURE | OPTICAL FIBER PUSHING AMOUNT |
| | | | PREHEATING TIME | |
| | | | ADDITIONAL HEATING TEMPERATURE | |
| | | | ADDITIONAL HEATING TIME | |

FIG.8

| ROTATION ANGLE θ [°] | FIRST PRINCIPAL COMPONENT PC1 | SECOND PRINCIPAL COMPONENT PC2 | THIRD PRINCIPAL COMPONENT PC3 | ⋮ |
|---|---|---|---|---|
| 0 | FEATURES Da11<br>FEATURES Da12<br>FEATURES Da13<br>⋯ | FEATURES Da21<br>FEATURES Da22<br>FEATURES Da23<br>⋯ | FEATURES Da31<br>FEATURES Da32<br>FEATURES Da33<br>⋯ | ⋮ |
| 5 | FEATURES Db11<br>FEATURES Db12<br>FEATURES Db13<br>⋯ | FEATURES Db21<br>FEATURES Db22<br>FEATURES Db23<br>⋯ | FEATURES Db31<br>FEATURES Db32<br>FEATURES Db33<br>⋯ | ⋮ |
| 10 | FEATURES Dc11<br>FEATURES Dc12<br>FEATURES Dc13<br>⋯ | FEATURES Dc21<br>FEATURES Dc22<br>FEATURES Dc23<br>⋯ | FEATURES Dc31<br>FEATURES Dc32<br>FEATURES Dc33<br>⋯ | ⋮ |
| ⋯ | ⋯ | ⋯ | ⋯ | ⋮ |

FIG.14

| ROTATION ANGLE θ [°] | RESTORED IMAGE DATA |
|---|---|
| 0 | RESTORED IMAGE DATA Ga11<br>RESTORED IMAGE DATA Ga12<br>RESTORED IMAGE DATA Ga13<br>⋮ |
| 5 | RESTORED IMAGE DATA Gb11<br>RESTORED IMAGE DATA Gb12<br>RESTORED IMAGE DATA Gb13<br>⋮ |
| 10 | RESTORED IMAGE DATA Gc11<br>RESTORED IMAGE DATA Gc12<br>RESTORED IMAGE DATA Gc13<br>⋮ |
| ⋮ | ⋮ |

FUSION SPLICING SYSTEM, FUSION SPLICER AND METHOD OF DETERMINING ROTATION ANGLE OF OPTICAL FIBER

CROSS-REFERENCE TO RELATED APPLICATIONS

The present application claims priority to and incorporates by reference the entire contents of Japanese Patent Application No. 2018-146081 filed in Japan on Aug. 2, 2018.

BACKGROUND OF THE INVENTION

1. Field of the Invention

The present invention relates to a fusion splicing system, a fusion splicer, and a method of determining a rotation angle of an optical fiber.

2. Description of the Related Art

In the related art, there is known a fusion splicer used for fusion splicing of optical fibers (for example, refer to Japanese Laid-open Patent Publication No. 2010-128290 and Japanese Laid-open Patent Publication No. 2002-169050). Typically, a fusion splicer successively performs a position recognition step of recognizing positions of end parts of a pair of optical fibers as a target of fusion splicing, and an axis alignment step of aligning center axes (core axes) of the pair of optical fibers the positions of which are recognized. Subsequently, the fusion splicer successively performs a heating step of heating and melting the end parts of the pair of optical fibers the axes of which are aligned, and a splicing step of butting the respective end parts of the pair of optical fibers that are heated and melted against each other to be spliced. Thereafter, the fusion splicer successively performs an inspection step of optically inspecting a fusion-spliced portion of the pair of optical fibers through image processing and the like, and a reinforcing step of mechanically reinforcing the fusion-spliced portion with a reinforcing member such as a sleeve. Through a series of steps from the position recognition step to the reinforcing step described above, the fusion splicer completes fusion splicing of the pair of optical fibers.

At each of the series of steps performed by the fusion splicer for fusion-splicing the pair of optical fibers as described above, automatic control is performed by a control unit of the fusion splicer. That is, at each of the series of steps performed by the fusion splicer, the control unit controls a functional unit of the fusion splicer based on various set values of a fusion condition required for fusion-splicing the pair of optical fibers as a target of fusion splicing. The various set values of the fusion condition include a set value that should be changed depending on a type of the pair of optical fibers to be fusion-spliced (specifically, physical characteristics such as material, a structure, and dimensions that are different depending on the type of the optical fiber), a wavelength of light to be transmitted through the pair of optical fibers after fusion splicing (hereinafter, referred to as a "transmission light wavelength") and the like. Hereinafter, each of the set values included in the fusion condition is referred to as a "parameter", and a group of parameters constituting the fusion condition is referred to as a "parameter set".

A storage unit of the fusion splicer stores a large number of parameter sets that are known at the time when the fusion splicer is manufactured or sold. The fusion splicer selects a parameter set required for fusion splicing of the pair of optical fibers from among the large number of parameter sets in the storage unit in accordance with the type, the transmission light wavelength and the like of the pair of optical fibers as a target of fusion splicing, and switches the fusion condition to the selected parameter set. By successively performing the series of steps described above based on the fusion condition (parameter set) that has been switched as described above, the fusion splicer can fusion-splices the pair of optical fibers with high finished quality (for example, with a low splicing loss).

SUMMARY OF THE INVENTION

An object of the present invention is to solve at least part of the problem of the known technique described above.

A fusion splicing system according to an embodiment of the present invention includes: a brightness profile extracting unit extracting brightness profile data indicating brightness profile in a radial direction of an optical fiber based on image data imaged from the radial direction of the optical fiber; a features extracting unit reducing the number of dimensions of the brightness profile data, thereby extracting a features of the brightness profile data for each rotation angle of the optical fiber; a prediction model creation unit performing machine learning by using teacher data indicating a correspondence relationship between a rotation angle of the optical fiber and brightness profile in the radial direction for each rotation angle of the optical fiber, the teacher data being created based on the features, and creating a prediction model that is able to determine a rotation angle of an arbitrary optical fiber based on brightness profile data indicating brightness profile in the radial direction of the arbitrary optical fiber; a determination unit determining the rotation angle of each of a pair of optical fibers by using the prediction model based on the brightness profile data that are extracted by the brightness profile extracting unit based on image data in the radial direction of the pair of optical fibers as a target of fusion splicing; and a functional unit performing rotation alignment of the pair of optical fibers based on the determined rotation angle, and fusion-splicing the pair of optical fibers after rotation alignment.

A fusion splicer according to an embodiment of the present invention includes: a brightness profile extracting unit extracting brightness profile data indicating brightness profile in a radial direction of a pair of optical fibers based on image data that are imaged from the radial direction of the pair of optical fibers as a target of fusion splicing; a determination unit determining a rotation angle of each of the pair of optical fibers by using a prediction model based on the brightness profile data of the pair of optical fibers that are extracted by the brightness profile extracting unit; and a functional unit performing rotation alignment of the pair of optical fibers based on the determined rotation angle, and fusion-splicing the pair of optical fibers after rotation alignment. Further, the prediction model is created to perform machine learning by using teacher data indicating a correspondence relationship between the rotation angle of the optical fiber and brightness profile in the radial direction for each rotation angle of the optical fiber, and to be able to determine the rotation angle of an arbitrary optical fiber based on brightness profile data indicating brightness profile in the radial direction of the arbitrary optical fiber, and the teacher data are created to indicate a correspondence relationship between the rotation angle of the optical fiber and brightness profile in the radial direction for each rotation angle of the optical fiber based on a features of the brightness profile data of the optical fiber that are extracted for each rotation angle of the optical fiber by reducing the number of dimensions of the brightness profile data indicating brightness profile in the radial direction of the optical fiber.

A method of determining a rotation angle of an optical fiber according to an embodiment of the present invention, includes: extracting brightness profile data indicating brightness profile in a radial direction of an optical fiber based on image data that are imaged from the radial direction of the optical fiber; reducing the number of dimensions of the brightness profile data to extract a features of the brightness profile data for each rotation angle of the optical fiber; performing machine learning by using teacher data indicating a correspondence relationship between the rotation angle of the optical fiber and brightness profile in the radial direction for each rotation angle of the optical fiber, the teacher data being created based on the features, and creating a prediction model that is able to determine the rotation angle of an arbitrary optical fiber based on brightness profile data indicating brightness profile in the radial direction of the arbitrary optical fiber; and determining the rotation angle of each of a pair of optical fibers by using the prediction model based on the brightness profile data that are extracted based on image data in the radial direction of the pair of optical fibers as a target.

It is possible to further understand the above description, other objects, characteristics, advantages, and technical and industrial values of the present invention by reading the following detailed description of the present invention with reference to the attached drawings.

BRIEF DESCRIPTION OF THE DRAWINGS

FIG. 3 is a diagram illustrating an example of each parameter of a fusion condition used for a functional unit of the fusion splicer according to the first embodiment of the present invention;

FIG. 8 is a diagram illustrating an example of teacher data used for machine learning according to the first embodiment of the present invention;

FIG. 14 is a diagram illustrating an example of teacher data used for machine learning according to the second embodiment of the present invention;

DETAILED DESCRIPTION OF THE PREFERRED EMBODIMENTS

Figure 1:
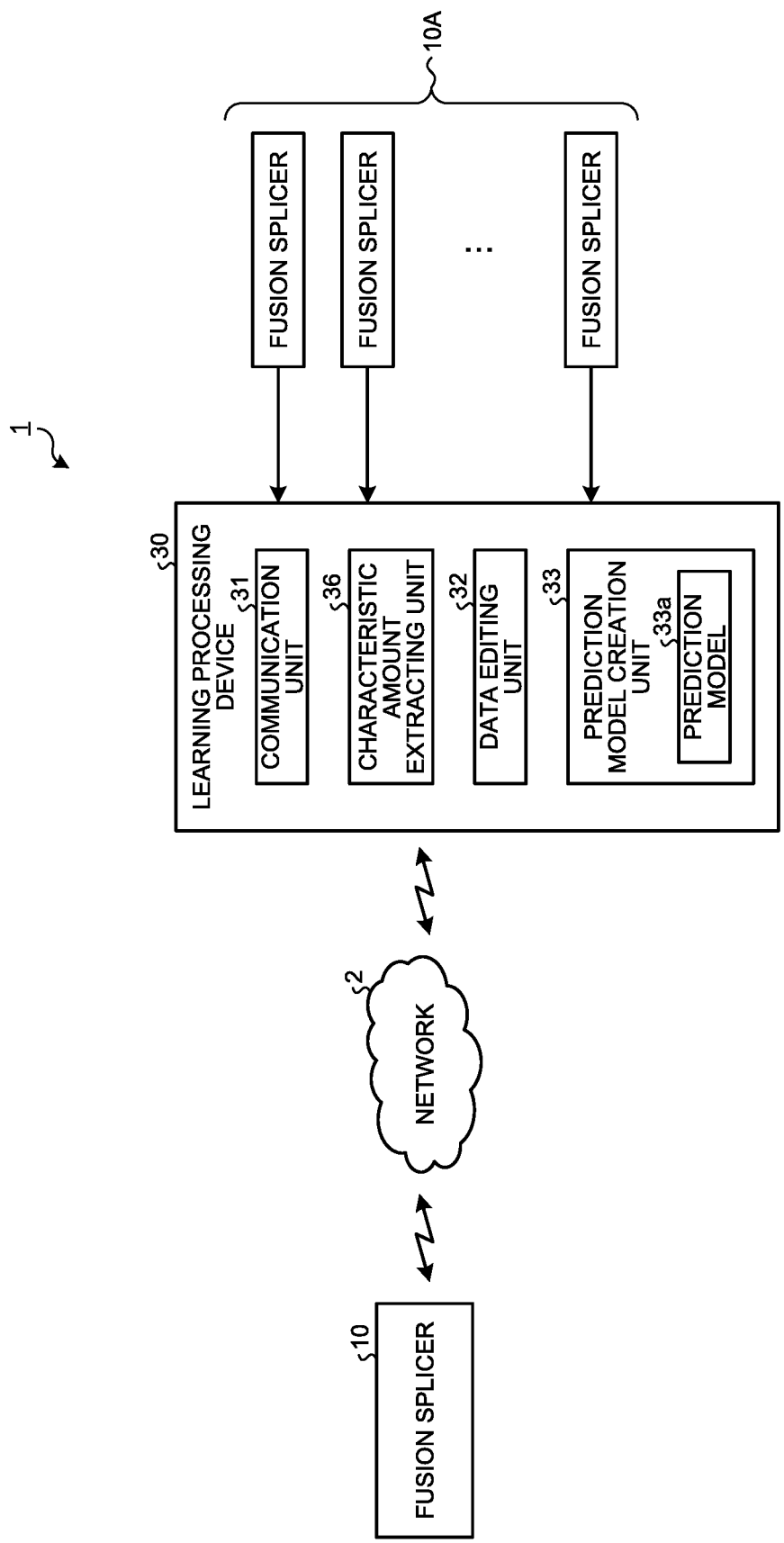
FIG. 1 is a diagram illustrating a configuration example of a fusion splicing system according to a first embodiment of the present invention.

The following describes an embodiment of a fusion splicing system, a fusion splicer, and a method of determining a rotation angle of an optical fiber according to the present invention in detail based on the attached drawings. The present invention is not limited to the embodiment, and can be variously modified without departing from the gist of the present invention. In the respective drawings, the same elements or corresponding elements are appropriately denoted by the same reference numeral. Additionally, it should be noted that the drawings are merely schematic, and a relationship between dimensions of the respective elements, a ratio of each element and the like may be different from those of actual elements. The drawings may include portions in which relations between dimensions or ratios are different from each other.

In a field of optical fibers, for example, there are known various optical fibers such as a single-mode optical fiber, a multi-mode optical fiber, a polarization maintaining optical fiber, and an optical fiber for transmitting laser light that are classified according to use or an optical characteristic, and optical fibers that are classified according to a physical characteristic such as a diameter, a core diameter, material of a core and cladding, a refractive index profile in a radial direction, and the like of an optical fiber. Specifically, in a case of fusion-splicing optical fibers having rotational symmetry of M times (M is an finite natural number, for example, 2 to 20) for a cross-sectional structure of the optical fiber like a polarization maintaining optical fiber, a multicore optical fiber and the like, at the axis alignment step described above, not only a radial direction position of the optical fiber is adjusted but also rotation alignment is performed to align rotational position around a center axis of the optical fiber for each of a pair of optical fibers.

In performing rotation alignment of the pair of optical fibers to be fusion-spliced, typically, a rotation angle (a rotation angle with respect to a rotation reference position of the optical fiber) needs to be determined for each of the pair of optical fibers set in the fusion splicer. However, in the related art described above, an operation of imaging image data in a radial direction of an optical fiber as a target needs to be repeated multiple times while changing the rotation angle of the optical fiber for each rotation alignment of the pair of optical fibers for determining the rotation angle of the optical fiber, so that there is the problem that much time is required to perform rotation alignment of the pair of optical fibers.

On the other hand, according to an embodiment of a fusion splicing system, a fusion splicer, and a method of determining a rotation angle of an optical fiber described below, time required for performing rotation alignment of a pair of optical fibers as a target can be easily shortened.

First Embodiment

Figure 2:
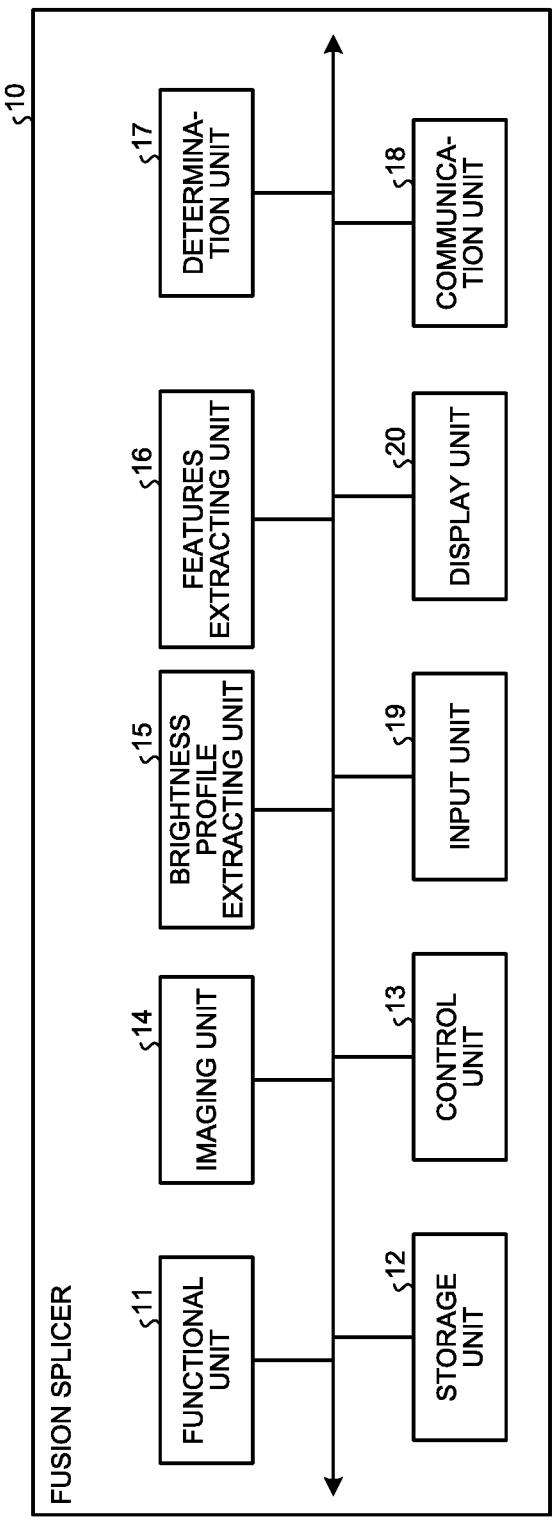
FIG. 2 is a diagram illustrating a configuration example of a fusion splicer according to the first embodiment of the present invention.

First, the following describes configurations of the fusion splicing system and the fusion splicer according to the first embodiment of the present invention. FIG. 1 is a diagram illustrating a configuration example of the fusion splicing system according to the first embodiment of the present invention. FIG. 2 is a diagram illustrating a configuration example of the fusion splicer according to the first embodiment of the present invention. As illustrated in FIG. 1, a fusion splicing system 1 according to the first embodiment includes at least one fusion splicer (a fusion splicer 10 and a group of fusion splicers 10A in the first embodiment), and a learning processing device 30 configured to be able to communicate with the fusion splicer 10 and each fusion splicer of the group of fusion splicers 10A via a network 2 and the like.

The fusion splicer 10 is, for example, an example of a fusion splicer used for fusion splicing of optical fibers by the user. The group of fusion splicers 10A is, for example, an example of a plurality of fusion splicers used for collecting, by a manufacturer side, data required for learning processing for creating a prediction model 33a that contributes to determination of the rotation angle of the optical fiber. The fusion splicers included in the group of fusion splicers 10A have individual differences between devices (for example, an individual difference in an optical system and the like), but the fusion splicers have the same configuration as that of the fusion splicer 10 on the user side. The following describes the configuration of the fusion splicer 10 as a representative of the fusion splicer 10 and the group of fusion splicers 10A.

As illustrated in FIG. 2, the fusion splicer 10 includes a functional unit 11 for performing fusion splicing of optical fibers, a storage unit 12 in which a plurality of parameter sets are preset, and a control unit 13 that controls each constituent part of the fusion splicer 10. The fusion splicer 10 also includes an imaging unit 14 that images image data viewed from a radial direction of the optical fiber, a brightness profile extracting unit 15 that extracts brightness profile data of the optical fiber, a features extracting unit 16 that extracts a features of the brightness profile data of the optical fiber, and a determination unit 17 that determines the rotation angle of the optical fiber. The fusion splicer 10 further includes a communication unit 18 for performing data communication with the outside, an input unit 19 for inputting various kinds of information, and a display unit 20 that displays various kinds of information.

The functional unit 11 performs rotation alignment of the pair of optical fibers as a target of fusion splicing (specifically, respective end parts of the pair of optical fibers) based on a rotation angle determined by the determination unit 17 (described later), and fusion-splices the pair of optical fibers after rotation alignment. Although not specifically illustrated, the functional unit 11 is constituted of, for example, a microscope unit for fusion-splicing the optical fibers, an axis aligning mechanism, a heating device, a feeding mechanism, a reinforcing mechanism and the like.

In the first embodiment, the functional unit 11 successively performs a position recognition step of recognizing positions of the respective end parts of the pair of optical fibers as a target of fusion splicing through image processing performed by the microscope unit, and an axis alignment step of aligning center axes (core axes) and rotational positions around the center axes of the pair of optical fibers the positions of which are recognized using the axis aligning mechanism. Subsequently, the functional unit 11 successively performs a heating step of heating and melting the respective end parts of the pair of optical fibers the axes of which are aligned using the heating device, and a splicing step of butting the respective end parts of the pair of optical fibers that are heated and melted against each other using the feeding mechanism to fusion-splice the pair of optical fibers. Thereafter, the functional unit 11 performs an inspection step of optically inspecting a fusion-spliced portion of the pair of optical fibers through image processing performed by the microscope unit. The functional unit 11 also performs a reinforcing step of mechanically reinforcing the fusion-spliced portion of the pair of optical fibers after the inspection step with a reinforcing member such as a sleeve using the reinforcing mechanism. Through a series of steps from the position recognition step to the reinforcing step described above, the functional unit 11 completes fusion splicing of the pair of optical fibers corresponding to a desired transmission light wavelength.

In the first embodiment, the optical fiber as a target of fusion splicing is an optical fiber having rotational symmetry of N times (N is a finite natural number) for a cross-sectional structure of the optical fiber like a polarization maintaining optical fiber, a multicore optical fiber and the like. That is, the optical fiber to be a determination target of the rotation angle at the time of fusion-splicing the optical fibers is the optical fiber having the rotational symmetry of N times described above. In the present invention, the optical fiber means an optical fiber having the rotational symmetry of N times described above unless specifically noted. The same applies to the pair of optical fibers.

The storage unit 12 previously stores a plurality of parameter sets that are known at the time of manufacture or sale of the fusion splicer 10. Due to this, these parameter sets are preset in the storage unit 12. The storage unit 12 also stores the prediction model 33a for determining the rotation angle of the optical fiber provided from the learning processing device 30 (described later).

The control unit 13 sets, as a fusion condition, a parameter set adapted to fusion splicing of the pair of optical fibers among the parameter sets in the storage unit 12 in accordance with a type, a transmission light wavelength and the like of the pair of optical fibers as a target of fusion splicing. The control unit 13 appropriately controls respective operations of the microscope unit, the axis aligning mechanism, the heating device, the feeding mechanism, and the reinforcing mechanism at the series of steps performed by the functional unit 11 described above based on respective parameters in the set parameter set. On the other hand, in a case in which the adapted parameter set described above is not preset in the storage unit 12, the control unit 13 sets a new parameter set that is acquired from the learning processing device 30 (described later) via the network 2 as the fusion condition required for fusion splicing of the two optical fibers. The control unit 13 also controls input/output of a signal to/from the storage unit 12, the imaging unit 14, the brightness profile extracting unit 15, the features extracting unit 16, the determination unit 17, the communication unit 18, the input unit 19, and the display unit 20, and respective operations thereof.

The imaging unit 14 images image data in the radial direction of the optical fiber. Specifically, the imaging unit 14 is constituted of a light source, an image sensor and the like. The imaging unit 14 emits light in the radial direction of the optical fiber from the light source for each of the pair of optical fibers set in the functional unit 11 of the fusion splicer 10, and detects light transmitted through the optical fiber with the image sensor. Due to this, the imaging unit 14 images image data viewed from the radial direction of the optical fiber (for example, transmission image data) for each of the pair of optical fibers. The image data includes a contrast distribution (that is, a brightness profile) that is generated in the radial direction of the optical fiber due to a refractive-index difference of the core portion and the cladding portion of the optical fiber, air and the like.

The brightness profile extracting unit 15 extracts brightness profile data of the optical fiber. Specifically, the brightness profile extracting unit 15 extracts brightness profile data (in the first embodiment, a luminance profile) indicating brightness profile in the radial direction of the optical fiber based on the image data imaged by the imaging unit 14 from the radial direction of the optical fiber. Specifically, in a case in which the imaging unit 14 images image data for each of the pair of optical fibers as a target of fusion splicing, the brightness profile extracting unit 15 extracts the brightness profile data (in the first embodiment, a luminance profile) indicating brightness profile in the radial direction of the pair of optical fibers based on the image data imaged by the imaging unit 14 from the radial direction of the pair of optical fibers. The luminance profile indicates brightness profile with respect to a radial direction position of the optical fiber, and is represented by a shape (waveform) of a graph in which a horizontal axis indicates the radial direction position and a vertical axis indicates luminance, for example.

The features extracting unit 16 extracts the features of the brightness profile data of the optical fiber. Specifically, the features extracting unit 16 reduces the number of dimensions N of the brightness profile data by principal component analysis and the like, for example, thereby extracting the features (the number of dimensions n, N>n) for the brightness profile data extracted by the brightness profile extracting unit 15. Such brightness profile data obtained by the brightness profile extracting unit 15 includes, as described above, the brightness profile data in the radial direction of the optical fiber, and the brightness profile data in the radial direction of the pair of optical fibers as a target of fusion splicing. In the first embodiment, the features extracting unit 16 extracts the features of the brightness profile data described above at the time when the rotation angle of each of the pair of optical fibers is determined. As a method of extracting the features performed by the features extracting unit 16, for example, principal component analysis, an autoencoder and the like are exemplified.

The determination unit 17 determines respective rotation angles for the pair of optical fibers as a target of fusion splicing. Specifically, the determination unit 17 determines the respective rotation angles of the optical fibers for the pair of optical fibers using the prediction model 33a based on the brightness profile data in the radial direction of the pair of optical fibers. In the first embodiment, the brightness profile data in the radial direction of the pair of optical fibers is extracted by the brightness profile extracting unit 15 based on the image data in the radial direction of the pair of optical fibers imaged by the imaging unit 14. The prediction model 33a is created by a prediction model creation unit 33 of the learning processing device 30 (described later), provided to the fusion splicer 10 from the learning processing device 30 via the network 2, for example, and stored in the storage unit 12.

The communication unit 18 communicates with the learning processing device 30. Specifically, the communication unit 18 receives the prediction model 33a from the learning processing device 30 via the network 2, for example. On the other hand, in the first embodiment, the communication unit 18 transmits, to the learning processing device 30, the features of the brightness profile data that is extracted by the features extracting unit 16 for each rotation angle of the optical fiber.

The input unit 19 is constituted of an input key and the like, and inputs various kinds of information in response to an input operation of a user or an operator. As the information input by the input unit 19, for example, exemplified are information related to the pair of optical fibers to be subjected to fusion splicing such as a transmission light wavelength, information for starting or stopping fusion splicing and the like. The display unit 20 is constituted of a display device such as a liquid crystal display, and displays various kinds of information instructed to be displayed by the control unit 13. As the information displayed by the display unit 20, for example, exemplified are information received by the communication unit 18 from the learning processing device 30, information transmitted from the communication unit 18 to the learning processing device 30, information input by the input unit 19 and the like. In the first embodiment, the network 2 is a communication network such as the Internet and a local area network (LAN), for example.

On the other hand, as illustrated in FIG. 1, the learning processing device 30 is a device that performs learning processing and the like for creating the prediction model 33a to be provided to the fusion splicer 10. For example, the learning processing device 30 is constituted of a computer such as a server and a workstation, and includes a communication unit 31, a features extracting unit 36, a data editing unit 32, and a prediction model creation unit 33 as illustrated in FIG. 1.

The communication unit 31 communicates with the fusion splicer 10 and each fusion splicer of the group of fusion splicers 10A. In the first embodiment, the communication unit 31 communicates with the communication unit 18 of the fusion splicer 10 via the network 2, and due to this, transmits the prediction model 33a to the communication unit 18 of the fusion splicer 10, for example. The communication unit 31 also communicates with the communication unit 18 of each fusion splicer of the group of fusion splicers 10A, and due to this, receives the features of the brightness profile data for each rotation angle of the optical fiber from the communication unit 18 of each fusion splicer, for example.

The features extracting unit 36 extracts the features of the brightness profile data of the optical fiber. Specifically, the features extracting unit 36 performs unsupervised learning on the brightness profile data collected via the communication unit 31 and the like, that is, the brightness profile data extracted by the brightness profile extracting unit 15 described above. Through the unsupervised learning, the features extracting unit 36 reduces the number of dimensions N of the brightness profile data, thereby extracting the features (the number of dimensions n, N>n) of the brightness profile data for each rotation angle of the optical fiber. Such brightness profile data obtained by the brightness profile extracting unit 15 includes, as described above, the brightness profile data in the radial direction of the optical fiber, and the brightness profile data in the radial direction of the pair of optical fibers as a target of fusion splicing. In the first embodiment, the features extracting unit 36 extracts the features of the brightness profile data in the radial direction of the optical fiber at the time when the prediction model 33a is created by machine learning. As a method of unsupervised learning used for extracting the features performed by the features extracting unit 36, for example, principal component analysis, an autoencoder and the like are exemplified.

The data editing unit 32 creates teacher data used for machine learning for creating the prediction model 33a. In the first embodiment, the data editing unit 32 creates the teacher data indicating a correspondence relationship between the rotation angle of the optical fiber and the brightness profile in the radial direction for each rotation angle of the optical fiber based on the features of the brightness profile data that is extracted by the features extracting unit 36 for each rotation angle of the optical fiber.

The prediction model creation unit 33 creates the prediction model 33a for determining the rotation angle of each of the pair of optical fibers as a target of fusion splicing. Specifically, the prediction model creation unit 33 performs machine learning by using the teacher data created by the data editing unit 32, and due to this, creates the prediction model 33a. The prediction model 33a can determine the rotation angle of an arbitrary optical fiber based on the brightness profile data indicating brightness profile in the radial direction of the arbitrary optical fiber. In the first embodiment, as machine learning performed by the prediction model creation unit 33, exemplified is supervised learning using a method such as a support vector machine, logistic regression, linear discriminant analysis, kernel ridge regression, and a neural network, for example. The prediction model 33a may be constituted of a plurality of prediction models.

Respective Parameters of Fusion Condition

Next, the following describes respective parameters of the fusion conditions that are respectively set in the fusion splicer 10 and each fusion splicer of the group of fusion splicers 10A according to the first embodiment of the present invention in detail. In the following description, the fusion splicer 10 on the user side is exemplified to explain the respective parameters of the fusion conditions, but the parameters of the fusion conditions are the same between the fusion splicer 10 on the user side and the group of fusion splicers 10A on the manufacturer side.

In fusion-splicing the optical fibers by the functional unit 11 of the fusion splicer 10, the control unit 13 controls the functional unit 11 based on the respective parameters of the fusion condition (parameter set) set in the fusion splicer 10. FIG. 3 is a diagram illustrating an example of the respective parameters of the fusion condition used for the functional unit of the fusion splicer according to the first embodiment of the present invention. As illustrated in FIG. 3, in the fusion splicer 10, the parameters of the fusion condition are set for each of the microscope unit, the axis aligning mechanism, the heating device, and the feeding mechanism constituting the functional unit 11, for example.

Specifically, as illustrated in FIG. 3, for example, an optical fiber diameter, an optical fiber core diameter, and an optical fiber cross-sectional structure are used as the parameters for the microscope unit of the functional unit 11. The control unit 13 reads out these parameters from the storage unit 12 of the fusion splicer 10, and controls an operation of the microscope unit such as image processing at the position recognition step and the inspection step described above based on the read-out parameters.

As illustrated in FIG. 3, for example, a transmission light wavelength, an optical fiber cross-sectional structure, and a center offset are used as the parameters for the axis aligning mechanism of the functional unit 11. The center offset is an adjustment amount of the positions of the end parts of the respective optical fibers to be butted against each other at the time of fusion splicing of the optical fibers (hereinafter, referred to as a butting position). The end parts of the respective optical fibers to be fusion-spliced are, typically, separated from each other at regular intervals around a discharge band of the heating device that heats and melts the end parts. However, the butting position may be adjusted (offset) depending on a combination of the pair of optical fibers to be fusion-spliced. The control unit 13 reads out these parameters from the storage unit 12, and controls the operation of the axis aligning mechanism at the axis alignment step described above based on the read-out parameters. On the other hand, in the first embodiment, although not previously set as the parameter of the fusion condition, the rotation angle that is determined by the determination unit 17 for each of the pair of optical fibers to be fusion-spliced is used for the axis aligning mechanism of the functional unit 11. The control unit 13 controls the operation of the axis aligning mechanism based on the rotation angle determined by the determination unit 17, and causes the axis aligning mechanism to perform rotation alignment of the pair of optical fibers so that respective rotation angles of the pair of optical fibers to be fusion-spliced become equal to each other.

As illustrated in FIG. 3, for example, an initial heating temperature, a molding heating temperature, a heating time, a preheating temperature, a preheating time, an additional-heating temperature, and an additional-heating time are used as the parameters for the heating device of the functional unit 11. The fusion-spliced portion of the optical fibers (for example, the fusion-spliced portion of the optical fibers having different core diameters) may be additionally heated after fusion splicing ends. Heat processing performed at this point is called additional heating, the additional-heating temperature is a heating temperature for additional heating, and the additional-heating time is a heating time for additional heating. The control unit 13 reads out these parameters from the storage unit 12, and controls the operation of the heating device at the heating step described above based on the read-out parameters.

As illustrated in FIG. 3, for example, a feeding start time, a feeding distance, a feeding speed, and an optical fiber pushing amount are set as the parameters for the feeding mechanism of the functional unit 11. The control unit 13 reads out these parameters from the storage unit 12, and controls the operation of the feeding mechanism at the splicing step described above based on the read-out parameters.

In the first embodiment, the fusion condition (parameter set) including the respective parameters exemplified in FIG. 3 is preset in the fusion splicer 10 (that is, stored in the storage unit 12) for each combination of the optical fibers. The fusion condition according to the first embodiment is not limited to the fusion condition including the parameters illustrated in FIG. 3, and may further include parameters other than those illustrated in FIG. 3, for example, parameters for the reinforcing mechanism that performs the reinforcing step described above and the like.

Creation of Prediction Model

Figure 4:
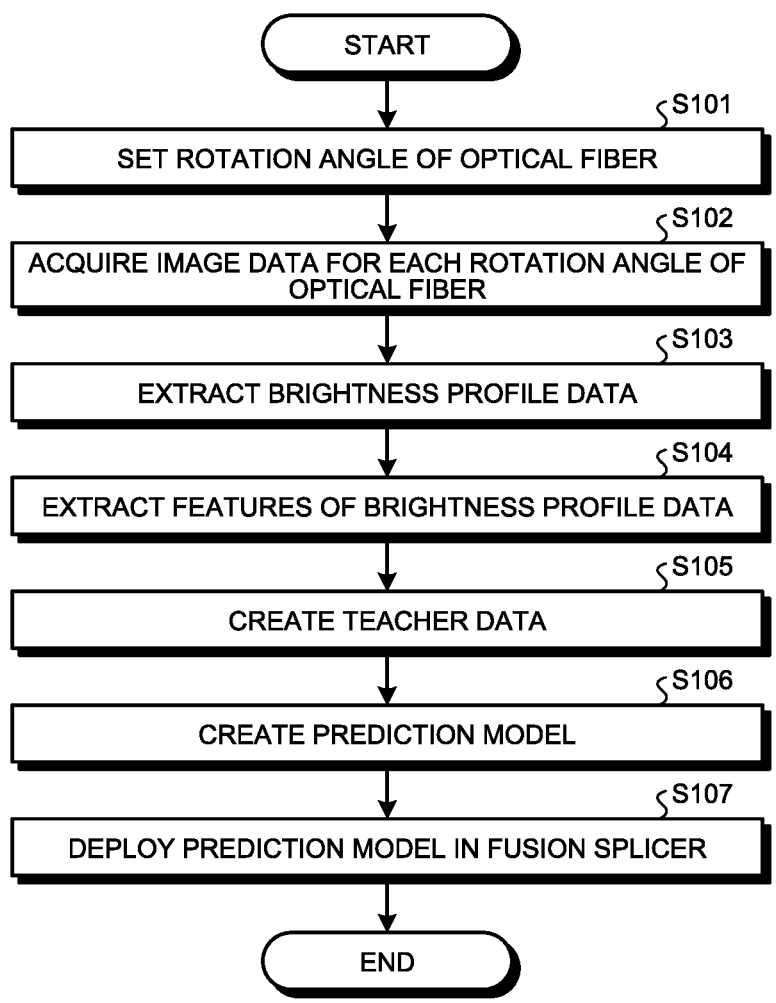
FIG. 4 is a flowchart illustrating an example of a processing procedure of creating a prediction model of a rotation angle of an optical fiber to be disposed in the fusion splicer according to the first embodiment of the present invention.

Next, the following describes a processing procedure of creating and disposing the prediction model 33a for determining the rotation angle for each of the pair of optical fibers as a target of fusion splicing performed by the fusion splicing system 1 according to the first embodiment. FIG. 4 is a flowchart illustrating an example of the processing procedure at the time of creating the prediction model of the rotation angle of the optical fiber to be deployed in the fusion splicer according to the first embodiment of the present invention. In the fusion splicing system 1 according to the first embodiment, the learning processing device 30 creates the prediction model 33a for determining the rotation angle for each of the pair of optical fibers as a target of fusion splicing to be deployed in the fusion splicer 10 by performing the respective processing steps illustrated in FIG. 4.

Specifically, as illustrated in FIG. 4, in the fusion splicing system 1, first, the control unit 13 sets the rotation angle of the optical fiber (Step S101). The rotation angle of the optical fiber set at Step S101 is a unit rotation angle and a total rotation angle at the time when the optical fiber is rotated around the center axis thereof for imaging a plurality of pieces of image data in the radial direction of the optical fiber for each rotation angle.

Figure 5:
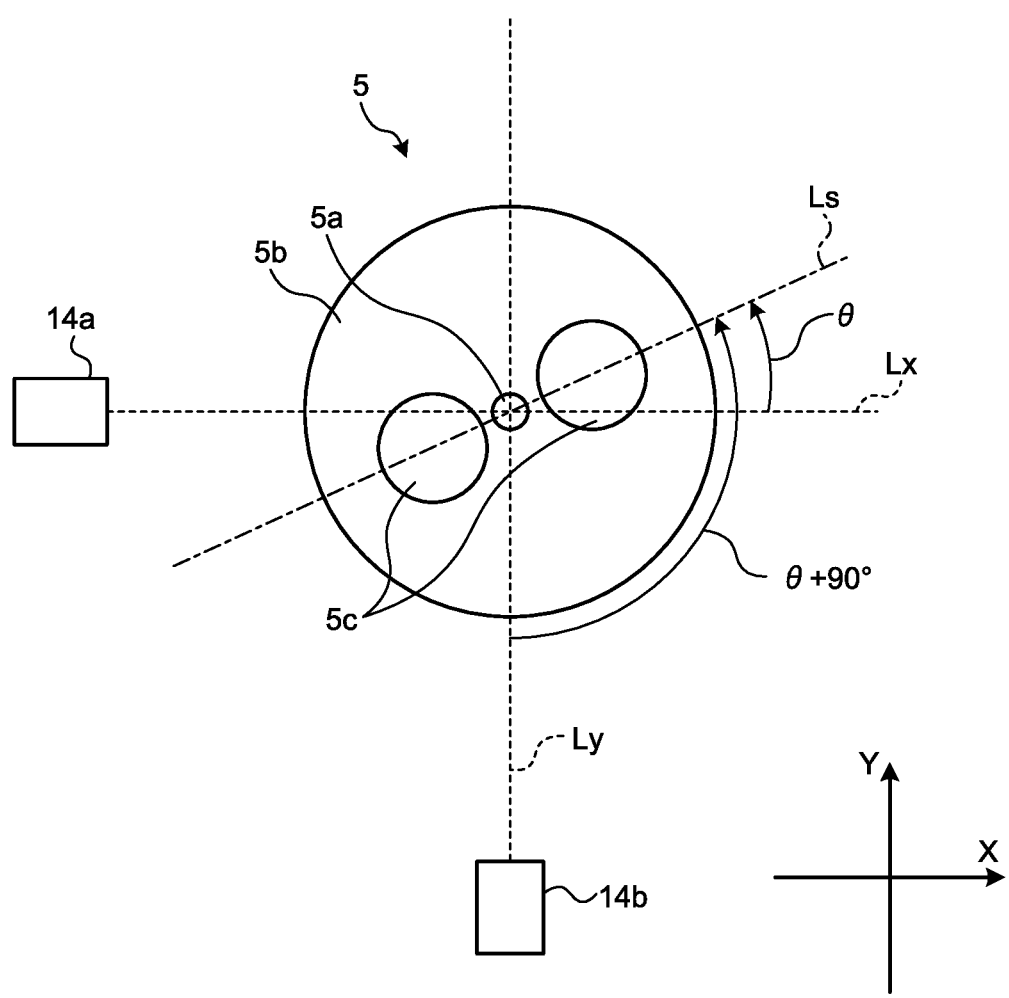
FIG. 5 is a diagram illustrating an example of the rotation angle of the optical fiber according to the first embodiment of the present invention.

FIG. 5 is a diagram illustrating an example of the rotation angle of the optical fiber according to the first embodiment of the present invention. In FIG. 5, a polarization maintaining optical fiber 5 is illustrated as an example of the optical fiber. The polarization maintaining optical fiber 5 includes a core portion 5a, a cladding portion 5b that is formed on an outer circumference of the core portion 5a and has a refractive index lower than that of the core portion 5a, and a pair of stress imparting units 5c that imparts stress to the core portion 5a from the radial direction. Image sensors 14a and 14b illustrated in FIG. 5 are included in each imaging unit 14 of the fusion splicer 10 and the group of fusion splicers 10A in the first embodiment.

As illustrated in FIG. 5, the image sensors 14a and 14b are disposed so that respective optical axes Lx and Ly thereof intersect at right angles. That is, the optical axis Lx of the image sensor 14a is parallel with an X-axis of a two-axis orthogonal coordinate system, and the optical axis Ly of the image sensor 14b is parallel with a Y-axis of the two-axis orthogonal coordinate system. In this case, assuming that a position passing through respective centers of the core portion 5a and the stress imparting unit 5c is a rotation reference position Ls, for example, the rotation angle θ[°] of the polarization maintaining optical fiber 5 is an angle formed by the optical axis Lx of the image sensor 14a and the rotation reference position Ls with respect to a predetermined direction around a center axis. In this case, the angle formed by the optical axis Ly of the image sensor 14b and the rotation reference position Ls of the polarization maintaining optical fiber 5 is represented as the rotation angle θ+90[°]. The definition of the rotation angle θ is not only for the polarization maintaining optical fiber 5, and the same applies to other optical fibers (optical fibers having rotational symmetry of N times).

At Step S101, for example, the control unit 13 sets, as the rotation angle θ of the optical fiber, the unit rotation angle and the total rotation angle at the time of imaging image data in the radial direction of the optical fiber based on information such as the type of the optical fiber and the rotation angle input by the input unit 19. In the first embodiment, the control unit 13 that performs such processing at Step S101 is included in each fusion splicer of the group of fusion splicers 10A.

After performing Step S101, in the fusion splicing system 1, the imaging unit 14 acquires image data for each rotation angle θ of the optical fiber (Step S102). At Step S102, the optical fiber as a target of imaging is set in the functional unit 11 to be able to rotate about the center axis by the axis aligning mechanism of the functional unit 11. The control unit 13 controls the axis aligning mechanism of the functional unit 11 so that the optical fiber rotates about the center axis in units of rotation set at Step S101 until the rotation angle θ reaches the total rotation angle. At the same time, the control unit 13 controls the imaging unit 14 to image the optical fiber rotated by the axis aligning mechanism. Every time the rotation angle θ of the optical fiber is changed by a unit rotation angle, the imaging unit 14 successively images the image data in the radial direction of the optical fiber based on the control by the control unit 13. The imaging unit 14 repeats imaging of the image data for each unit rotation angle until the rotation angle θ of the optical fiber reaches the total rotation angle.

For example, the imaging unit 14 images the image data in the radial direction at the rotation angle θ of the optical fiber (in FIG. 5, the polarization maintaining optical fiber 5), and the image data in the radial direction at the rotation angle θ+90° with the image sensors 14a and 14b illustrated in FIG. 5. Due to this, when the optical fiber is rotated about the center axis by 90°, the imaging unit 14 can acquire image data corresponding to the optical fiber rotated by 180°.

At Step S102, as described above, the imaging unit 14 acquires a plurality of pieces of image data in the radial direction of the optical fiber for each rotation angle θ (specifically, for each unit rotation angle). For example, in a case in which the unit rotation angle of the optical fiber is 5°, as the pieces of image data imaged by the imaging unit 14, exemplified are image data in the radial direction of the optical fiber at the rotation angle θ=0°, image data in the radial direction of the optical fiber at the rotation angle θ=5°, image data in the radial direction of the optical fiber at the rotation angle θ=10° and the like. In the first embodiment, an axis aligning unit, the control unit 13, and the imaging unit 14 of the functional unit 11 that performs such processing at Step S102 are included in each fusion splicer of the group of fusion splicers 10A.

After performing Step S102, in the fusion splicing system 1, the brightness profile extracting unit 15 extracts the brightness profile data of the optical fiber (Step S103). At Step S103, the brightness profile extracting unit 15 collects, from the imaging unit 14, the image data that is imaged from the radial direction of the optical fiber at Step S102 described above for each rotation angle θ of the optical fiber. The brightness profile extracting unit 15 extracts the brightness profile data indicating brightness profile in the radial direction of the optical fiber based on the image data collected from the imaging unit 14.

Figure 6:
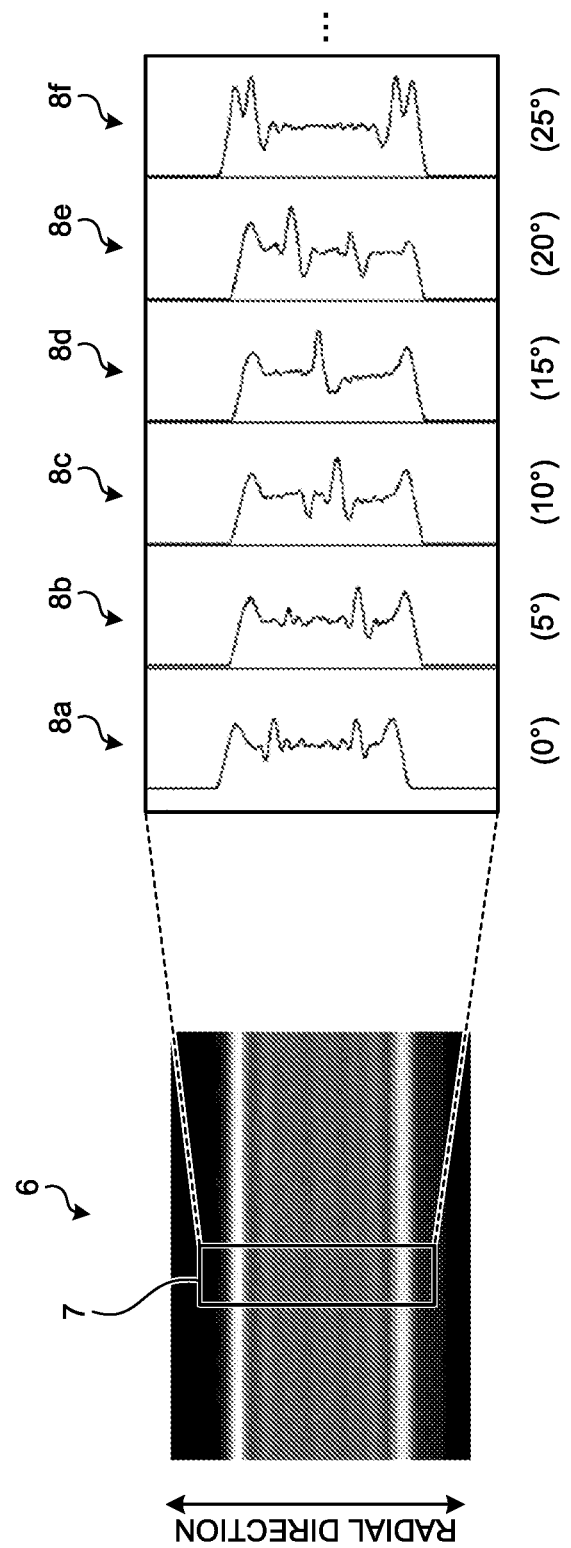
FIG. 6 is a diagram illustrating extraction of brightness profile data of the optical fiber according to the first embodiment of the present invention.

FIG. 6 is a diagram illustrating extraction of the brightness profile data of the optical fiber according to the first embodiment of the present invention. In FIG. 6, a "radial direction" means the radial direction of the optical fiber. Side view image data [山本 洋次1] 6 is an example of the image data in the radial direction of the optical fiber imaged by the imaging unit 14. The side view image data 6 is image data including brightness profile in the radial direction of the optical fiber. The brightness profile included in the side view image data 6 is different for each rotation angle θ of the optical fiber.

In the first embodiment, as illustrated in FIG. 6 for example, the brightness profile extracting unit 15 extracts partial image data 7 including brightness profile in the radial direction at an axial direction predetermined position of the optical fiber from a predetermined position in the side view image data 6 of the optical fiber. Subsequently, the brightness profile extracting unit 15 performs predetermined image processing on the extracted partial image data 7 to extract a luminance profile indicating the brightness profile in the radial direction of the optical fiber accordingly. That is, the brightness profile data of the optical fiber in the first embodiment are data of the luminance profile. The brightness profile extracting unit 15 performs such processing of extracting the luminance profile in the radial direction of the optical fiber from the partial image data 7 in the side view image data 6 for each piece of the side view image data 6 for each rotation angle θ collected from the imaging unit 14. For example, as illustrated in FIG. 6, the brightness profile extracting unit 15 extracts a luminance profile 8a at the rotation angle θ=0° of the optical fiber from the partial image data 7 in the side view image data 6 of the optical fiber at the rotation angle θ=0°. Similarly, the brightness profile extracting unit 15 extracts respective luminance profiles 8b, 8c, 8d, 8e, and 8f at rotation angles θ=5°, 10°, 15°, 20°, and 25° from the respective pieces of side view image data 6 at the rotation angles θ=5°, 10°, 15°, 20°, and 25°.

At Step S103, as described above, the brightness profile extracting unit 15 acquires a plurality of luminance profiles as the brightness profile data of the optical fiber for each rotation angle θ. In the first embodiment, the brightness profile extracting unit 15 that performs such processing at Step S103 is included in each fusion splicer of the group of fusion splicers 10A.

After performing Step S103, in the fusion splicing system 1, the features extracting unit 36 of the learning processing device 30 extracts the features of the brightness profile data of the optical fiber (Step S104). At Step S104, the communication unit 31 of the learning processing device 30 receives, from the communication unit 18 of each fusion splicer of the group of fusion splicers 10A, the brightness profile data that is extracted by the brightness profile extracting unit 15 for each rotation angle θ of the optical fiber at Step S103 described above. The features extracting unit 36 collects the brightness profile data from the brightness profile extracting unit 15 for each rotation angle θ of the optical fiber via the communication unit 31. The features extracting unit 36 performs unsupervised learning on the collected brightness profile data for each rotation angle θ of the optical fiber, reduces the number of dimensions N of the brightness profile data to be the number of dimensions n (n<N) through the unsupervised learning, thereby extracting the features of the brightness profile data for each rotation angle θ of the optical fiber.

Figure 7:
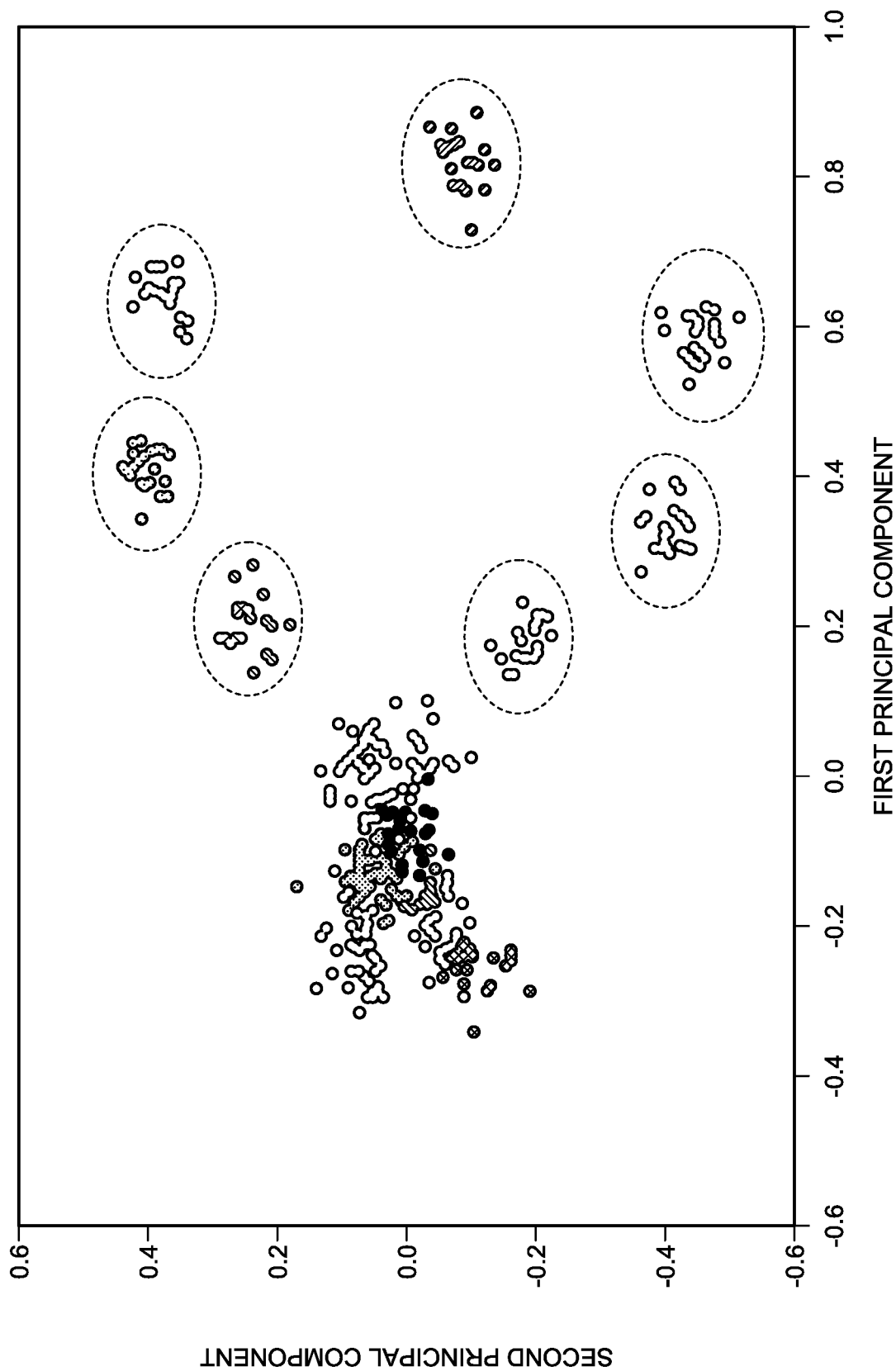
FIG. 7 is a diagram illustrating extraction of a features of the brightness profile data for each rotation angle of the optical fiber according to the first embodiment of the present invention.

FIG. 7 is a diagram illustrating extraction of the features of the brightness profile data for each rotation angle of the optical fiber according to the first embodiment of the present invention. FIG. 7 illustrates an example of a result obtained by extracting the features of the brightness profile data for each rotation angle θ of the optical fiber by using principal component analysis as a method of unsupervised learning. In the first embodiment, the features extracting unit 36 reduces the number of dimensions N of the luminance profile (an example of the brightness profile data) of the optical fiber collected from the brightness profile extracting unit 15 to be the number of dimensions n by principal component analysis of unsupervised learning, thereby extracting the features of the luminance profile as data of the n-th principal component (n is a natural number) for each rotation angle θ of the optical fiber. For example, in a case in which the number of dimensions N of the luminance profile of the optical fiber is reduced to be two, as illustrated in FIG. 7, the features of the luminance profile is extracted as the features of each of the first principal component and the second principal component for each rotation angle θ. In this case, each of data groups surrounded by a dashed line in FIG. 7 is a data group of the features of the luminance profile that is extracted for each rotation angle θ of the optical fiber.

At Step S104, as described above, the features extracting unit 36 acquires a plurality of features the number of dimensions N of which is reduced to be n (for example, features of the n-th principal component) for each rotation angle θ as features of the luminance profile of the optical fiber. In the first embodiment, the features extracting unit 36 that performs such processing at Step S104 is included in the learning processing device 30.

After performing Step S104, in the fusion splicing system 1, the data editing unit 32 of the learning processing device 30 creates teacher data used for machine learning for creating the prediction model 33a (Step S105). At Step S105, the data editing unit 32 collects the features of the brightness profile data from the features extracting unit 36 for each rotation angle θ of the optical fiber. The data editing unit 32 creates the teacher data to indicate a correspondence relationship between the rotation angle θ of the optical fiber and the brightness profile in the radial direction for each rotation angle θ of the optical fiber based on the collected features for each rotation angle θ. In the first embodiment, the created teacher data are a data set indicating, for each rotation angle θ of the optical fiber, a correspondence relationship between the rotation angle θ of the optical fiber and the features of the luminance profile indicating the brightness profile in the radial direction as the correspondence relationship between the rotation angle θ of the optical fiber and the brightness profile in the radial direction.

FIG. 8 is a diagram illustrating an example of the teacher data used for machine learning according to the first embodiment of the present invention. In the first embodiment, for example, the data editing unit 32 creates the teacher data as illustrated in FIG. 8 based on each features of the n-th principal component PCn that is collected for each rotation angle θ of the optical fiber as the features of the brightness profile data described above. The teacher data indicate the correspondence relationship between the rotation angle θ of the optical fiber and the brightness profile in the radial direction for each rotation angle θ of the optical fiber by using each features of the n-th principal component PCn (that is, each features of the luminance profile the number of dimensions of which is reduced).

For example, as illustrated in FIG. 8, in the teacher data, the rotation angle θ equal to 0° is associated with features of a first principal component PC1 (Da11, Da12, Da13, . . . ), features of a second principal component PC2 (Da21, Da22, Da23, . . . ), features of a third principal component PC3 (Da31, Da32, Da33, . . . ) and the like at the time when the rotation angle θ=0°. The rotation angle θ equal to 5° is associated with features of the first principal component PC1 (Db11, Db12, Db13, . . . ), features of the second principal component PC2 (Db21, Db22, Db23, . . . ), features of the third principal component PC3 (Db31, Db32, Db33, . . . ) and the like at the time when the rotation angle θ=5°. The rotation angle θ equal to 10° is associated with features of the first principal component PC1 (Dc11, Dc12, Dc13, . . . ), features of the second principal component PC2 (Dc21, Dc22, Dc23, . . . ), features of the third principal component PC3 (Dc31, Dc32, Dc33, . . . ) and the like at the time when the rotation angle θ=10°.

The data editing unit 32 uses part of the features of the brightness profile data collected for each rotation angle θ of the optical fiber for creating the teacher data described above, accumulates part thereof as evaluation data for machine learning, and accumulates part thereof as test data for machine learning.

After performing Step S105, in the fusion splicing system 1, the prediction model creation unit 33 of the learning processing device 30 creates the prediction model 33a for determining each rotation angle θ of the pair of optical fibers as a target of fusion splicing (Step S106). At Step S106, the prediction model creation unit 33 acquires, from the data editing unit 32, the teacher data created at Step S105 described above, the evaluation data, and the test data. The prediction model creation unit 33 performs machine learning by using the acquired teacher data, and due to this, creates the prediction model 33a that can determine the rotation angle θ of an arbitrary optical fiber based on the brightness profile data indicating brightness profile in the radial direction of the arbitrary optical fiber. At this point, for example, the prediction model creation unit 33 creates the prediction model 33a by performing supervised learning using the teacher data described above, and improves determination accuracy of the created prediction model 33a by using the evaluation data. Subsequently, the prediction model creation unit 33 causes the prediction model 33a after learning to determine the rotation angle θ with the test data. Due to this, the prediction model creation unit 33 checks whether the rotation angle θ of an arbitrary optical fiber is correctly determined by the prediction model 33a based on the brightness profile data (in the first embodiment, the features of the luminance profile) in the radial direction of the arbitrary optical fiber, and causes the prediction model 33a to be able to determine the rotation angle θ with high accuracy. As the prediction model 33a created as described above, for example, the following regression expression (1) is exemplified.

$$\theta = f(PC1, PC2, PC3, \ldots, PCn) \quad (1)$$

Figure 9:
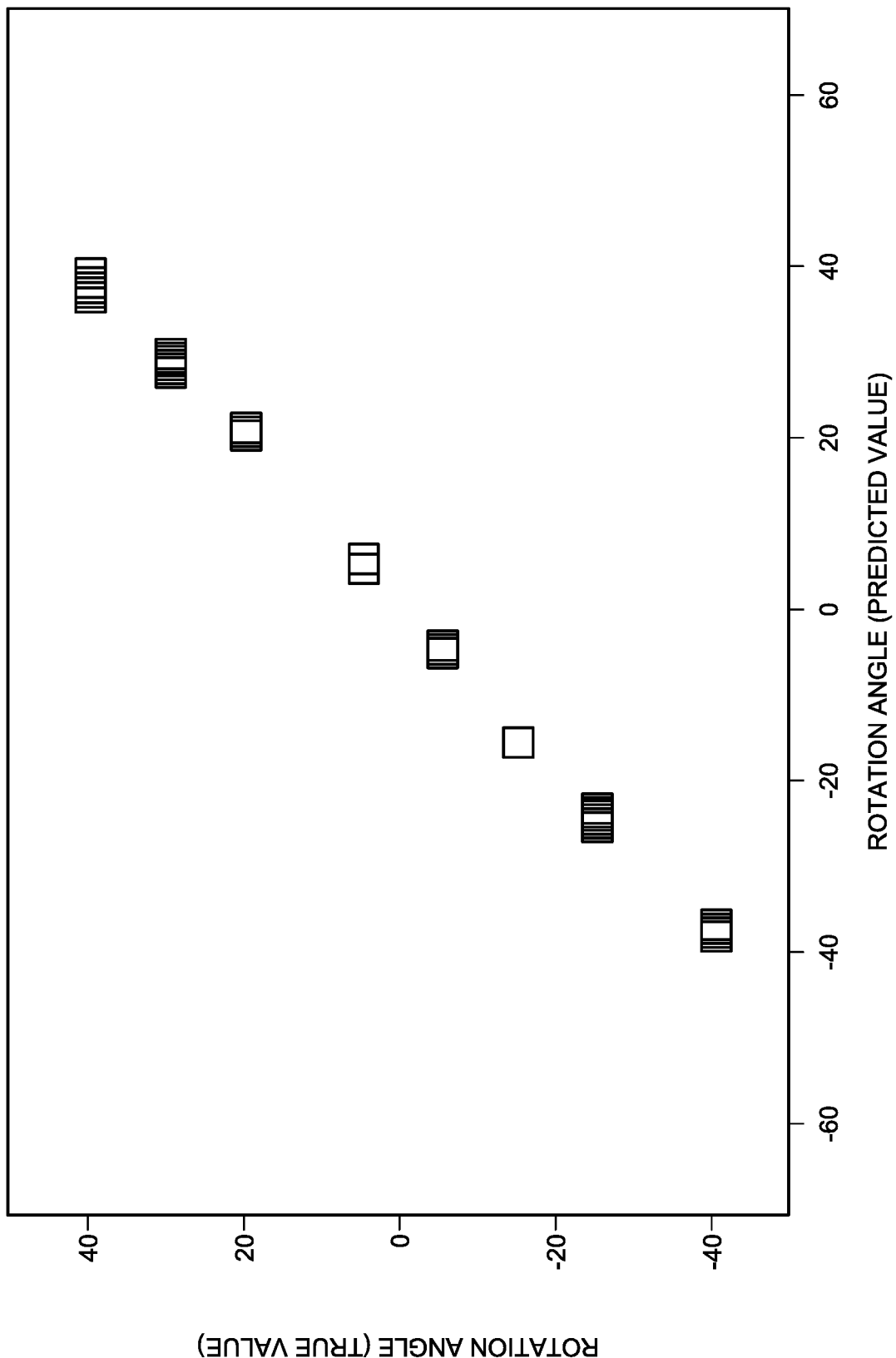
FIG. 9 is a diagram illustrating a result obtained by checking determination accuracy of the prediction model for the rotation angle of the optical fiber according to the first embodiment of the present invention.

FIG. 9 is a diagram illustrating a result obtained by checking determination accuracy of the prediction model for the rotation angle of the optical fiber according to the first embodiment of the present invention. As illustrated in FIG. 9, the rotation angle θ of the optical fiber that is determined by the prediction model 33a based on the features of the luminance profile (that is, a predicted value of the rotation angle of the optical fiber) was substantially the same value as an actual rotation angle θ (a true value) of the optical fiber. A determination error of the rotation angle θ generated by the prediction model 33a is equal to or smaller than 1°, which is within a permissible range in fusion splicing of the pair of optical fibers. The determination error of the rotation angle θ is not limited to the value equal to or smaller than 1° described above, and may be any value within a permissible range for the pair of optical fibers to be fusion-spliced.

After performing Step S106, in the fusion splicing system 1, the learning processing device 30 deploys the prediction model 33a in the fusion splicer 10 on the user side (Step S107), and this processing ends. At Step S107, the communication unit 31 of the learning processing device 30 acquires the prediction model 33a created at Step S106 described above from the prediction model creation unit 33, and transmits (provides) the acquired prediction model 33a to the fusion splicer 10 via the network 2. The communication unit 18 of the fusion splicer 10 receives the prediction model 33a via the network 2. The storage unit 12 acquires the prediction model 33a from the communication unit 18 to be stored therein. In this way, the prediction model 33a created by the prediction model creation unit 33 is deployed in the fusion splicer 10.

Fusion Splicing of Pair of Optical Fibers

Figure 10:
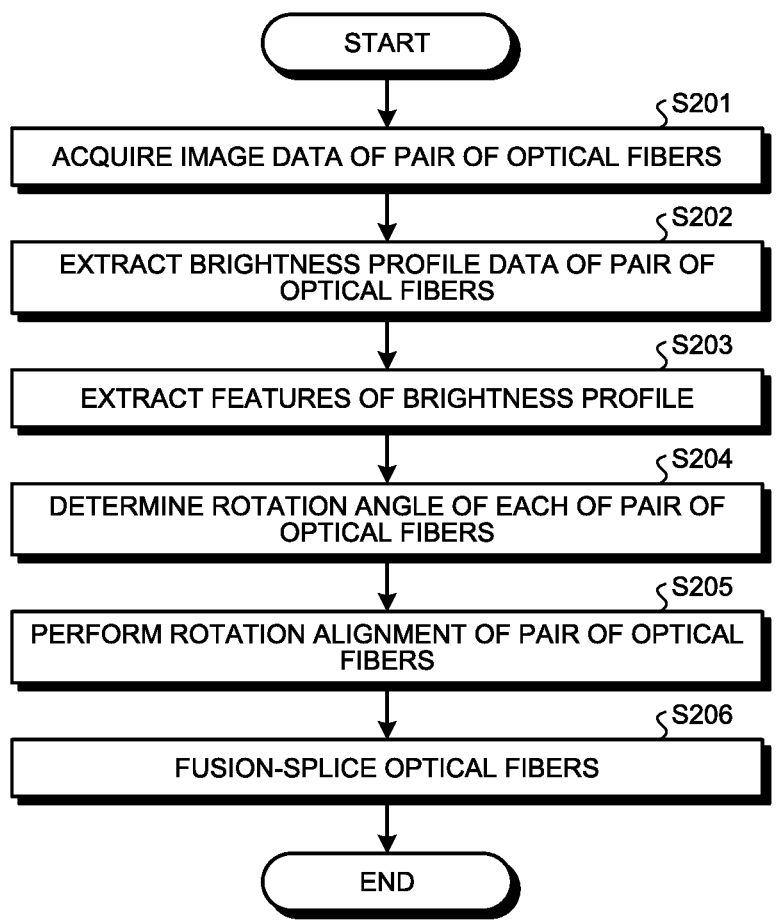
FIG. 10 is a flowchart illustrating an example of a processing procedure of fusion-splicing a pair of optical fibers as a target of fusion splicing according to the first embodiment of the present invention.

Next, the following describes a processing procedure of fusion splicing of the pair of optical fibers as a target of fusion splicing performed by the fusion splicing system 1 according to the first embodiment. FIG. 10 is a flowchart illustrating an example of the processing procedure at the time of fusion-splicing the pair of optical fibers as a target of fusion splicing according to the first embodiment of the present invention. In the following description, one of the pair of optical fibers to be fusion-spliced (hereinafter, appropriately abbreviated as a "pair of optical fibers") is appropriately referred to as an optical fiber F1, and the other one thereof is appropriately referred to as an optical fiber F2. In the fusion splicing system 1 according to the first embodiment, through the processing steps illustrated in FIG. 10, the rotation angle θ is determined for each of the pair of optical fibers as a target of fusion splicing, rotation alignment of the pair of optical fibers is performed based on a determination result of the rotation angle θ, and the pair of optical fibers after rotation alignment is fusion-spliced.

Specifically, as illustrated in FIG. 10, first, the imaging unit 14 acquires the image data of the pair of optical fibers as a target of fusion splicing in the fusion splicing system 1 (Step S201). At Step S201, the pair of optical fibers as a target of fusion splicing is set in the functional unit 11. The control unit 13 controls the imaging unit 14 to image the set pair of optical fibers. The imaging unit 14 images the image data in the radial direction of the pair of optical fibers (for example, the image data in the radial direction in a state in which end faces of the one optical fiber F1 and the other optical fiber F2 are opposed to each other) based on the control by the control unit 13. At this point, the functional unit 11 holds the pair of optical fibers without being rotated in a state in which the end faces thereof are opposed to each other differently from the case at Step S102 described above. The imaging unit 14 may image the image data described above with both of the two image sensors 14a and 14b illustrated in FIG. 5, or may image the image data described above with any one of the image sensors 14a and 14b (for example, the image sensor 14a having the optical axis Lx as a reference of the rotation angle θ of the optical fiber). It is sufficient that the imaging unit 14 images the image data described above once for the pair of optical fibers. In the first embodiment, the functional unit 11, the control unit 13, and the imaging unit 14 in the processing at Step S201 are included in the fusion splicer 10.

After performing Step S201, in the fusion splicing system 1, the brightness profile extracting unit 15 extracts the brightness profile data of the pair of optical fibers (Step S202). At Step S202, the brightness profile extracting unit 15 acquires, from the imaging unit 14, the image data that is imaged from the radial direction of the pair of optical fibers at Step S201 described above. The brightness profile extracting unit 15 extracts the brightness profile data indicating brightness profile in the radial direction of the pair of optical fibers based on the image data acquired from the imaging unit 14.

In the first embodiment, the brightness profile data of the pair of optical fibers extracted at Step S202 are data of the luminance profile indicating the brightness profile in the radial direction of the pair of optical fibers. Specifically, the brightness profile extracting unit 15 extracts partial image data including brightness profile in the radial direction of the one optical fiber F1 and partial image data including brightness profile in the radial direction of the other optical fiber F2 from the image data in the radial direction of the pair of optical fibers acquired from the imaging unit 14. Subsequently, the brightness profile extracting unit 15 performs predetermined image processing on the respective pieces of extracted partial image data to extract a luminance profile indicating the brightness profile in the radial direction of the one optical fiber F1 and a luminance profile indicating the brightness profile in the radial direction of the other optical fiber F2 accordingly. In the first embodiment, the brightness profile extracting unit 15 in the processing at Step S202 is included in the fusion splicer 10.

After performing Step S202, in the fusion splicing system 1, the features extracting unit 16 extracts the features of the brightness profile data of the pair of optical fibers (Step S203). At Step S203, the features extracting unit 16 acquires, from the brightness profile extracting unit 15, the brightness profile data that are extracted based on the image data in the radial direction of the pair of optical fibers at Step S202 described above. The features extracting unit 16 reduces the number of dimensions N of the brightness profile data of the pair of optical fibers acquired from the brightness profile extracting unit 15 to be the number of dimensions n (n<N) by principal component analysis and the like, for example, thereby extracting the features of the brightness profile data.

In the first embodiment, the features extracting unit 16 reduces the number of dimensions N of the luminance profile to be the number of dimensions n, the luminance profile being extracted as the brightness profile data of the pair of optical fibers by the brightness profile extracting unit 15 at Step S202, thereby extracting the features of the luminance profile of the pair of optical fibers. That is, the features extracting unit 16 extracts the features of the luminance profile of the one optical fiber F1 and the features of the luminance profile of the other optical fiber F2. As the features of the luminance profile extracted as described above, for example, exemplified is a features the number of dimensions N of which is reduced to be n (features of the n-th principal component) by principal component analysis. In the first embodiment, the features extracting unit 16 in the processing at Step S203 is included in the fusion splicer 10.

After performing Step S203, in the fusion splicing system 1, the determination unit 17 determines the each rotation angle θ for each of the pair of optical fibers using the prediction model 33a described above based on the brightness profile data that is extracted based on the image data in the radial direction of the pair of optical fibers as a target of fusion splicing (Step S204).

At Step S204, the determination unit 17 reads out, from the storage unit 12, the prediction model 33a that is disposed in the fusion splicer 10 at Step S107 illustrated in FIG. 4. The determination unit 17 also acquires, from the features extracting unit 16, the features of the brightness profile data of the pair of optical fibers extracted at Step S203 described above, that is, the features of the brightness profile data of each of the optical fibers F1 and F2. Subsequently, the determination unit 17 determines the rotation angle θ of the optical fiber F1 using the prediction model 33a based on the features of the brightness profile data (in the first embodiment, the features of the luminance profile) of the optical fiber F1. Subsequently, the determination unit 17 determines the rotation angle θ of the optical fiber F2 using the prediction model 33a based on the features of the brightness profile data (in the first embodiment, the features of the luminance profile) of the optical fiber F2. In the first embodiment, the determination unit 17 in the processing at Step S204 is included in the fusion splicer 10.

After performing Step S204, in the fusion splicing system 1, the functional unit 11 performs rotation alignment of the pair of optical fibers as a target of fusion splicing (Step S205). At Step S205, the axis aligning mechanism of the functional unit 11 performs rotation alignment of the pair of optical fibers that has been already set based on the control by the control unit 13.

Specifically, in the functional unit 11, the microscope unit performs the position recognition step described above for the pair of optical fibers. Subsequently, the axis aligning mechanism performs the axis alignment step described above for the pair of optical fibers the positions of which are recognized at the position recognition step. At this point, the axis aligning mechanism adjusts (aligns) radial direction positions of the pair of optical fibers to align center axes (core axes) of the pair of optical fibers. Subsequently, the axis aligning mechanism performs rotation alignment of the pair of optical fibers based on the rotation angle θ of each of the pair of optical fibers (that is, the rotation angle θ of each of the optical fibers F1 and F2) that is determined by the determination unit 17 at Step S204 described above. At this point, the axis aligning mechanism rotates the optical fibers F1 and F2 relatively to the center axis so that the rotation angle θ of the one optical fiber F1 becomes the same as the rotation angle θ of the other optical fiber F2, and due to this, performs rotation alignment of the optical fibers F1 and F2. In the first embodiment, the functional unit 11 in the processing at Step S205 is included in the fusion splicer 10.

After performing Step S205, in the fusion splicing system 1, the functional unit 11 fusion-splices the pair of optical fibers as a target of fusion splicing (Step S206), and this processing ends. At Step S206, the functional unit 11 fusion-splices the pair of optical fibers after rotation alignment at Step S205 described above.

Specifically, the functional unit 11 successively performs the series of steps including the heating step, the splicing step and the like described above for the pair of optical fibers based on the control by the control unit 13. Due to this, the functional unit 11 fusion-splices the pair of optical fibers described above, that is, the two optical fibers F1 and F2 after rotation alignment. In the first embodiment, the functional unit 11 in the processing at Step S206 is included in the fusion splicer 10.

The processing steps at Steps S101 to S107 illustrated in FIG. 4 and the processing steps at Steps S201 to S204 illustrated in FIG. 10 constitute the method of determining the rotation angle of the optical fiber according to the first embodiment of the present invention. In the method of determining the rotation angle, the respective processing steps at Steps S101 to S107 are performed in a case of creating the prediction model 33a for determining the rotation angle θ of the optical fiber. On the other hand, the respective processing steps at Steps S201 to S204 are performed in a case in which the rotation angle θ of each of the pair of optical fibers needs to be determined, for example, in a case of performing rotation alignment of the pair of optical fibers to be fusion-spliced.

As described above, in the first embodiment of the present invention, the number of dimensions of the brightness profile data that is extracted based on the image data in the radial direction of the optical fiber is reduced, the features of the brightness profile data (in the first embodiment, the features of the luminance profile) is extracted for each rotation angle of the optical fiber, the teacher data indicating the correspondence relationship between the rotation angle of the optical fiber and the brightness profile in the radial direction for each rotation angle of the optical fiber are created based on the features, machine learning is performed by using the teacher data, the prediction model is created to be able to determine the rotation angle of an arbitrary optical fiber based on the brightness profile data indicating brightness profile in the radial direction of the arbitrary optical fiber, and the rotation angle of each of the pair of optical fibers is determined by using the prediction model based on the brightness profile data that is extracted based on the image data in the radial direction of the pair of optical fibers as a target. Additionally, rotation alignment of the pair of optical fibers is performed based on the determined rotation angle, and the pair of optical fibers after rotation alignment is spliced (in the first embodiment, fusion-spliced).

Thus, it is not required to image multiple times the image data in the radial direction of the pair of optical fibers that is set in the fusion splicer and the like to be actually spliced for each rotation angle of the pair of optical fibers, and by imaging the set pair of optical fibers once while maintaining the state thereof, the brightness profile data of the pair of optical fibers can be extracted based on the image data that is once imaged, and the rotation angle can be determined for each of the pair of optical fibers in a current state with high accuracy using the prediction model based on the obtained brightness profile data. Additionally, rotation alignment of the pair of optical fibers can be simply performed so that the determined rotation angles of the pair of optical fibers become the same angle. Due to this, time required for determining the rotation angle of each of the pair of optical fibers to perform rotation alignment of the pair of optical fibers can be simply shortened. Furthermore, time required for splicing (for example, fusion-splicing) the pair of optical fibers can be shortened.

By performing machine learning using the teacher data indicating the correspondence relationship between the rotation angle of the optical fiber and the brightness profile in the radial direction for each rotation angle of the optical fiber, the prediction model is created to be able to determine the rotation angle of an arbitrary optical fiber based on the brightness profile data indicating the brightness profile in the radial direction of the arbitrary optical fiber, and the prediction model is used for determining the rotation angle of each of the pair of optical fibers. Thus, it is possible to determine the rotation angle of various optical fibers, and save time and effort for developing and disposing a determination program for determining a rotation angle of a new type of optical fiber.

The data such as brightness profile of the optical fiber required for machine learning for creating the prediction model is collected from each of the fusion splicers, so that the rotation angle of each of the pair of optical fibers can be determined with high accuracy without being influenced by variations among manufacturing lots of the pair of optical fibers as a target or an individual difference of a device (specifically, an individual difference of an observation system) between fusion splicers.

Second Embodiment

Figure 11:
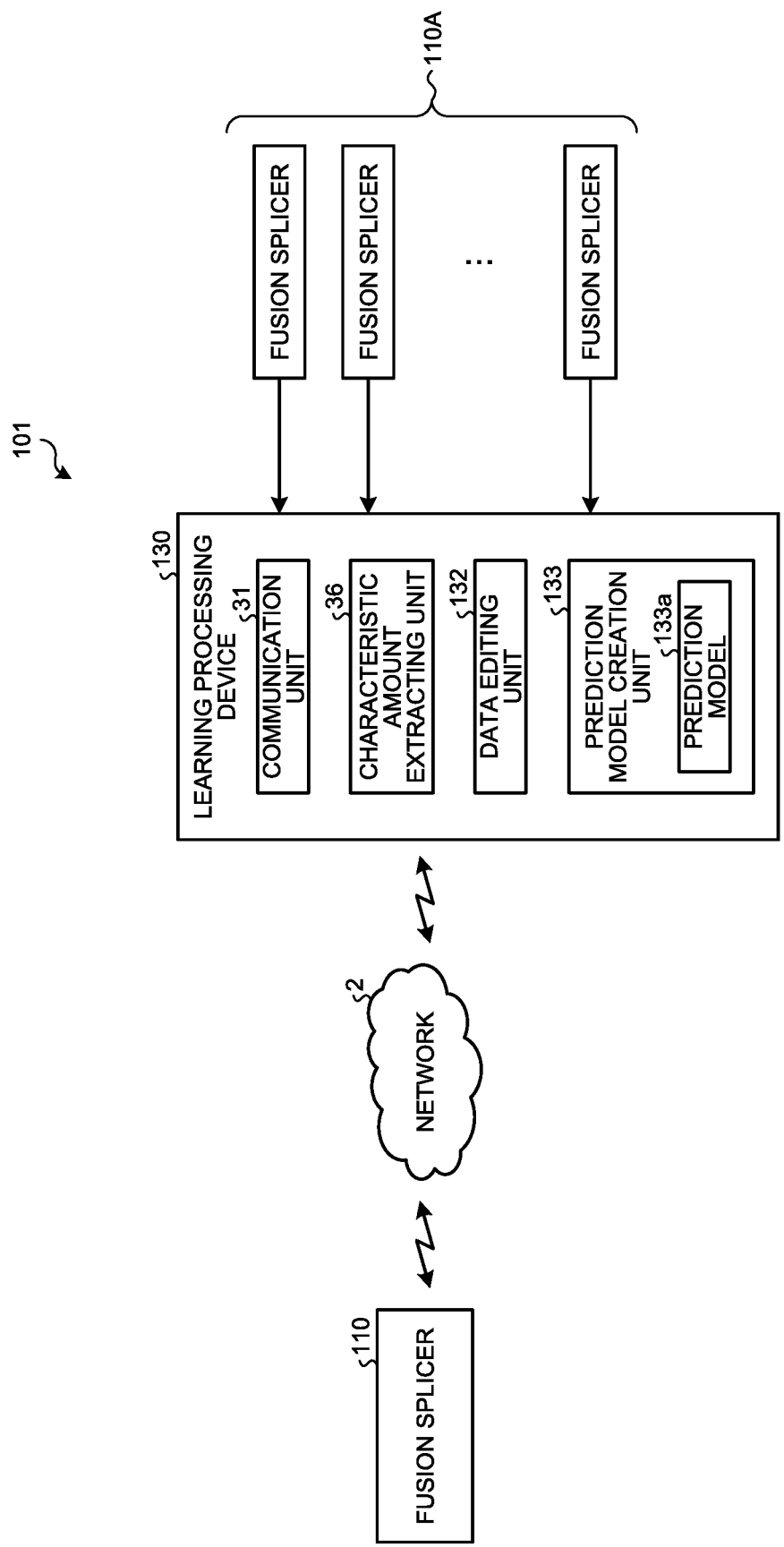
FIG. 11 is a diagram illustrating a configuration example of a fusion splicing system according to a second embodiment of the present invention.
Figure 12:
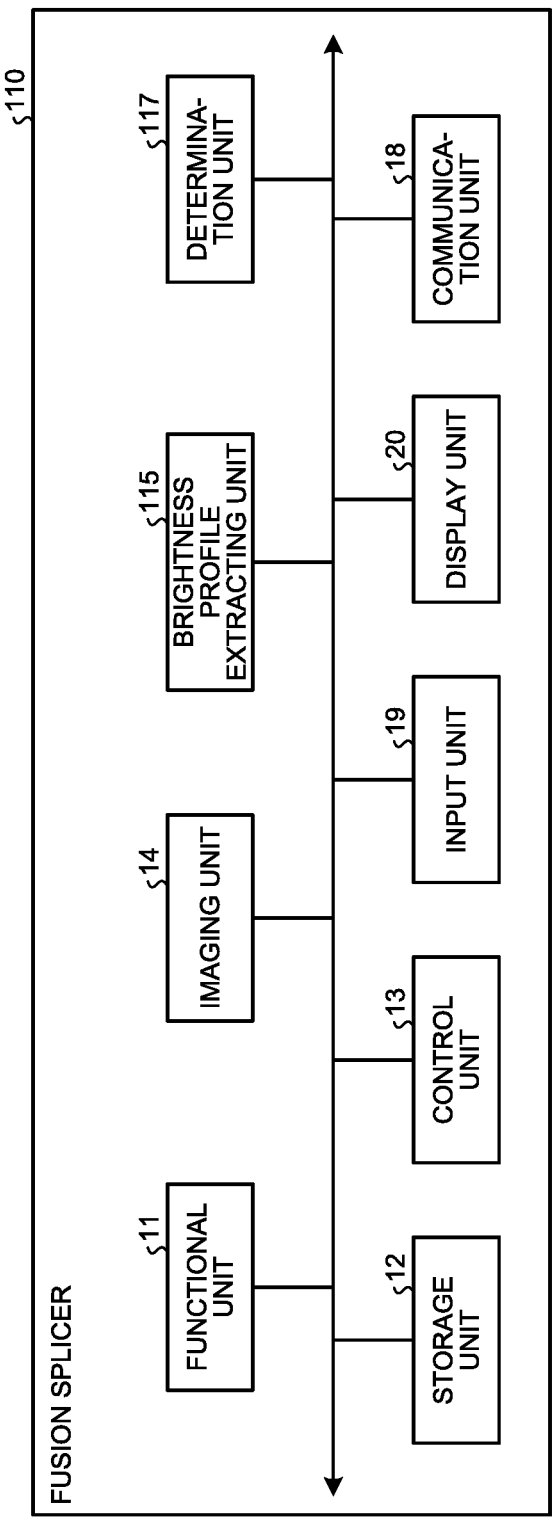
FIG. 12 is a diagram illustrating a configuration example of a fusion splicer according to the second embodiment of the present invention.

Next, the following describes a second embodiment of the present invention. FIG. 11 is a diagram illustrating a configuration example of the fusion splicing system according to the second embodiment of the present invention. FIG. 12 is a diagram illustrating a configuration example of the fusion splicer according to the second embodiment of the present invention. As illustrated in FIG. 11, a fusion splicing system 101 according to the second embodiment includes a fusion splicer 110 and a group of fusion splicers 110A in place of the fusion splicer 10 and the group of fusion splicers 10A of the fusion splicing system 1 according to the first embodiment described above, and includes a learning processing device 130 in place of the learning processing device 30. The learning processing device 130 includes a data editing unit 132 in place of the data editing unit 32 of the learning processing device 30 according to the first embodiment described above, includes a prediction model creation unit 133 in place of the prediction model creation unit 33, and further includes the features extracting unit 36 described above. As illustrated in FIG. 12, the fusion splicer 110 and the group of fusion splicers 110A according to the second embodiment include a brightness profile extracting unit 115 in place of the brightness profile extracting unit 15 of the fusion splicer 10 and the group of fusion splicers 110A according to the first embodiment described above, includes a determination unit 117 in place of the determination unit 17, and does not include the features extracting unit 16 described above. Other configurations are the same as those of the first embodiment, and the same constituent portion is denoted by the same reference numeral. Definition of the optical fiber in the second embodiment is also the same as that in the first embodiment described above.

In the second embodiment, the fusion splicer 110 and the group of fusion splicers 110A have the same configuration. The following describes the configuration of the fusion splicer 110 as a representative of the fusion splicer 110 and the group of fusion splicers 110A.

In the fusion splicer 110 illustrated in FIG. 12, the brightness profile extracting unit 115 extracts the brightness profile data of the optical fiber. Specifically, the brightness profile extracting unit 115 extracts the brightness profile data (in the second embodiment, luminance image data) indicating brightness profile in the radial direction of the optical fiber based on image data that is imaged by the imaging unit 14 from the radial direction of the optical fiber. Specifically, in a case in which the imaging unit 14 images image data for each of the pair of optical fibers as a target of fusion splicing, the brightness profile extracting unit 115 extracts the brightness profile data (in the second embodiment, luminance image data) indicating brightness profile in the radial direction of the pair of optical fibers based on the image data imaged by the imaging unit 14 from the radial direction of the pair of optical fibers.

The determination unit 117 determines a rotation angle of each of the pair of optical fibers as a target of fusion splicing. Specifically, the determination unit 117 determines the rotation angle of each of the pair of optical fibers by using a prediction model 133a based on the brightness profile data in the radial direction of the pair of optical fibers. In the second embodiment, the brightness profile data in the radial direction of the pair of optical fibers is extracted by the brightness profile extracting unit 115 based on the image data in the radial direction of the pair of optical fibers imaged by the imaging unit 14. The prediction model 133a is created by the prediction model creation unit 133 of the learning processing device 130 (described later), provided to the fusion splicer 110 from the learning processing device 130 via the network 2, for example, and stored in the storage unit 12.

On the other hand, in the learning processing device 130 illustrated in FIG. 11, the features extracting unit 36 extracts the features of the brightness profile data of the optical fiber. Specifically, the features extracting unit 36 performs unsupervised learning on the brightness profile data extracted by the brightness profile extracting unit 115 described above (in the second embodiment, the brightness profile extracting unit 115 of each fusion splicer of the group of fusion splicers 110A), and reduces the number of dimensions of the brightness profile data, thereby extracting the features of the brightness profile data for each rotation angle of the optical fiber through the unsupervised learning. As described above, the brightness profile data obtained by the brightness profile extracting unit 115 includes the brightness profile data in the radial direction of the optical fiber and the brightness profile data in the radial direction of the pair of optical fibers as a target of fusion splicing. In the second embodiment, at the time when the prediction model 133a is created by machine learning, the features extracting unit 36 extracts the features of the brightness profile data in the radial direction of the optical fiber. As a method of unsupervised learning used for extracting the features by the features extracting unit 36, for example, principal component analysis and an autoencoder are exemplified.

The data editing unit 132 creates the teacher data used for machine learning for creating the prediction model 133a. In the second embodiment, the data editing unit 132 creates the teacher data indicating a correspondence relationship between the rotation angle of the optical fiber and the brightness profile in the radial direction for each rotation angle of the optical fiber based on the features of the brightness profile data that are extracted by the features extracting unit 36 for each rotation angle of the optical fiber.

The prediction model creation unit 133 creates the prediction model 133a for determining the rotation angle of each of the pair of optical fibers as a target of fusion splicing. Specifically, the prediction model creation unit 133 performs machine learning by using the teacher data created by the data editing unit 132, and due to this, creates the prediction model 133a. The prediction model 133a can determine the rotation angle of an arbitrary optical fiber based on the brightness profile data indicating the brightness profile in the radial direction of the arbitrary optical fiber. In the second embodiment, as machine learning performed by the prediction model creation unit 133, for example, exemplified is deep learning by using a method such as a convolution neural network.

Creation of Prediction Model

Next, the following describes a processing procedure of creating and disposing the prediction model 133a for determining the rotation angle of each of the pair of optical fibers as a target of fusion splicing in the fusion splicing system 101 according to the second embodiment. In the fusion splicing system 101 according to the second embodiment, through processing steps substantially the same as Steps S101 to S107 illustrated in FIG. 4, the prediction model 133a for determining the rotation angle of each of the pair of optical fibers as a target of fusion splicing is created by the learning processing device 130 to be disposed in the fusion splicer 110. That is, in the second embodiment, among Steps S101 to S107 described above, each processing step of Step S101 and Step S102 is the same as that in the first embodiment, and each processing step of Step S103, Step S104, Step S105, Step S106, and Step S107 is different from that in the first embodiment.

Specifically, at Step S103 in the second embodiment, the brightness profile extracting unit 115 collects, from the imaging unit 14, the image data that are imaged from the radial direction of the optical fiber at Step S102 described above for each rotation angle θ of the optical fiber. The brightness profile extracting unit 115 extracts the brightness profile data indicating the brightness profile in the radial direction of the optical fiber based on the image data collected from the imaging unit 14.

Figure 13:
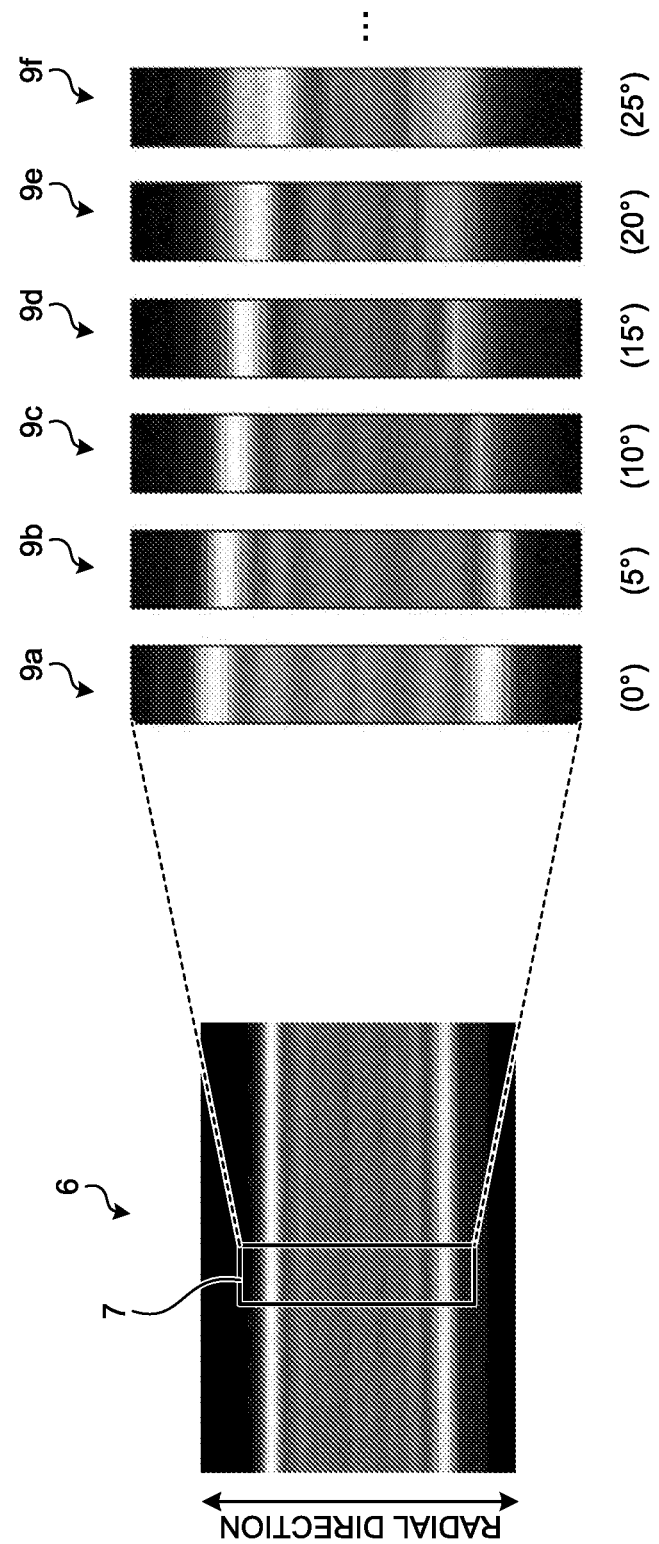
FIG. 13 is a diagram illustrating extraction of brightness profile data of an optical fiber according to the second embodiment of the present invention.

FIG. 13 is a diagram illustrating extraction of the brightness profile data of the optical fiber according to the second embodiment of the present invention. In FIG. 13, the "radial direction" means the radial direction of the optical fiber. In the second embodiment, as illustrated in FIG. 13 for example, the brightness profile extracting unit 115 extracts, as the luminance image data indicating the brightness profile in the radial direction of the optical fiber, the partial image data 7 including the brightness profile in the radial direction at an axial direction predetermined position of the optical fiber from a predetermined position in the side view image data 6 of the optical fiber. That is, the brightness profile data of the optical fiber in the second embodiment is the luminance image data described above. The brightness profile extracting unit 115 performs such processing of extracting the luminance image data in the radial direction of the optical fiber from the side view image data 6 for respective pieces of the side view image data 6 for each rotation angle θ (refer to FIG. 5) collected from the imaging unit 14. For example, as illustrated in FIG. 13, the brightness profile extracting unit 115 extracts luminance image data 9a at the rotation angle θ=0° of the optical fiber from the side view image data 6 of the optical fiber at the rotation angle θ=0°. Similarly, the brightness profile extracting unit 115 extracts pieces of luminance image data 9b, 9c, 9d, 9e, and 9f at respective rotation angles θ=5°, 10°, 15°, 20°, and 25° from the pieces of side view image data 6 at respective rotation angles θ=5°, 10°, 15°, 20°, and 25°.

At Step S103 in the second embodiment, as described above, the brightness profile extracting unit 115 acquires a plurality of pieces of luminance image data as the brightness profile data of the optical fiber for each rotation angle θ. In the second embodiment, the brightness profile extracting unit 115 that performs such processing at Step S103 is included in each fusion splicer of the group of fusion splicers 110A.

At Step S104 in the second embodiment, the communication unit 31 of the learning processing device 130 receives, from the communication unit 18 of each fusion splicer of the group of fusion splicers 110A, the brightness profile data that is extracted by the brightness profile extracting unit 115 for each rotation angle θ of the optical fiber at Step S103 described above. The features extracting unit 36 collects the brightness profile data from the brightness profile extracting unit 115 for each rotation angle θ of the optical fiber via the communication unit 31. Similarly to the first embodiment, the features extracting unit 36 performs unsupervised learning on the brightness profile data (specifically, the luminance image data) for each rotation angle θ of the optical fiber that is collected from the brightness profile extracting unit 115 as described above, and reduces the number of dimensions N of the brightness profile data to be the number of dimensions n (n<N), thereby extracting the features of the brightness profile data for each rotation angle θ of the optical fiber through the unsupervised learning. Specifically, the features extracting unit 36 acquires a plurality of features the number of dimensions N of which is reduced to be n (for example, features of the n-th principal component) for each rotation angle θ as features of the luminance image data of the optical fiber.

At Step S105 in the second embodiment, the data editing unit 132 collects, from the features extracting unit 36, the features of the brightness profile data extracted at Step S104 described above for each rotation angle θ of the optical fiber. The data editing unit 132 creates a data set indicating a correspondence relationship between the rotation angle θ of the optical fiber and the features of the brightness profile data (in the second embodiment, the luminance image data) for each rotation angle θ of the optical fiber based on the collected features for each rotation angle θ. In this case, each features in the data set is extracted by reducing the number of dimensions of the luminance image data by the features extracting unit 36 described above. The data editing unit 132 performs dimension restoration of restoring the number of dimensions n of the features to be the number of dimensions N before being reduced on each of the features in the data set, and due to this, reconstructs restored image data from each of the features. The restored image data are image data that are reconstructed to have the features of the luminance image data extracted by the features extracting unit 36 described above.

In this way, the data editing unit 132 creates, as the teacher data, a data set indicating a correspondence relationship between the rotation angle θ of the optical fiber and the restored image data having the features of the luminance image data for each rotation angle θ of the optical fiber. That is, in the second embodiment, the created teacher data are a data set indicating, as a correspondence relationship between the rotation angle θ of the optical fiber and the brightness profile in the radial direction, a correspondence relationship between the rotation angle θ of the optical fiber and the restored image data reconstructed by performing dimension restoration of the features for each rotation angle θ of the optical fiber.

FIG. 14 is a diagram illustrating an example of the teacher data used for machine learning according to the second embodiment of the present invention. In the second embodiment, as illustrated in FIG. 14 for example, the data editing unit 132 converts each features of the n-th principal component PCn collected for each rotation angle θ of the optical fiber into the restored image data by dimension restoration to create the teacher data. The teacher data indicates the correspondence relationship between the rotation angle θ of the optical fiber and the brightness profile in the radial direction for each rotation angle θ of the optical fiber by using each piece of the restored image data of the n-th principal component PCn.

For example, as illustrated in FIG. 14, in the teacher data, the rotation angle θ equal to 0° is associated with pieces of the restored image data (Ga11, Ga12, Ga13, . . . ) at the time when the rotation angle θ=0°. The rotation angle θ equal to 5° is associated with pieces of the restored image data (Gb11, Gb12, Gb13, . . . ) at the time when the rotation angle θ=5°. The rotation angle θ equal to 10° is associated with pieces of the restored image data (Gc11, Gc12, Gc13, . . . ) at the time when the rotation angle θ=10°.

The data editing unit 132 uses part of the features of the brightness profile data collected for each rotation angle θ of the optical fiber for creating the teacher data described above, accumulates part thereof as the evaluation data for machine learning, and accumulates part thereof as the test data for machine learning.

On the other hand, at Step S106 in the second embodiment, the prediction model creation unit 133 acquires, from the data editing unit 132, the teacher data created at Step S105 described above, the evaluation data, and the test data. The prediction model creation unit 133 performs machine learning by using the acquired teacher data, and creates the prediction model 133a that can determine the rotation angle θ of an arbitrary optical fiber based on the brightness profile data indicating the brightness profile in the radial direction of the arbitrary optical fiber. In this case, the machine learning according to the second embodiment is, for example, deep learning. For example, the prediction model creation unit 133 performs deep learning with a convolution neural network by using the teacher data to create the prediction model 133a. The prediction model creation unit 133 improves determination accuracy of the created prediction model 133a by using the evaluation data. Subsequently, the prediction model creation unit 133 causes the prediction model 133a after learning to determine the rotation angle θ with the test data. Due to this, the prediction model creation unit 133 checks whether the rotation angle θ of an arbitrary optical fiber is correctly determined by the prediction model 133a based on the brightness profile data (in the second embodiment, the luminance image data) in the radial direction of the arbitrary optical fiber, and causes the prediction model 133a to be able to determine the rotation angle θ with high accuracy.

Figure 15:
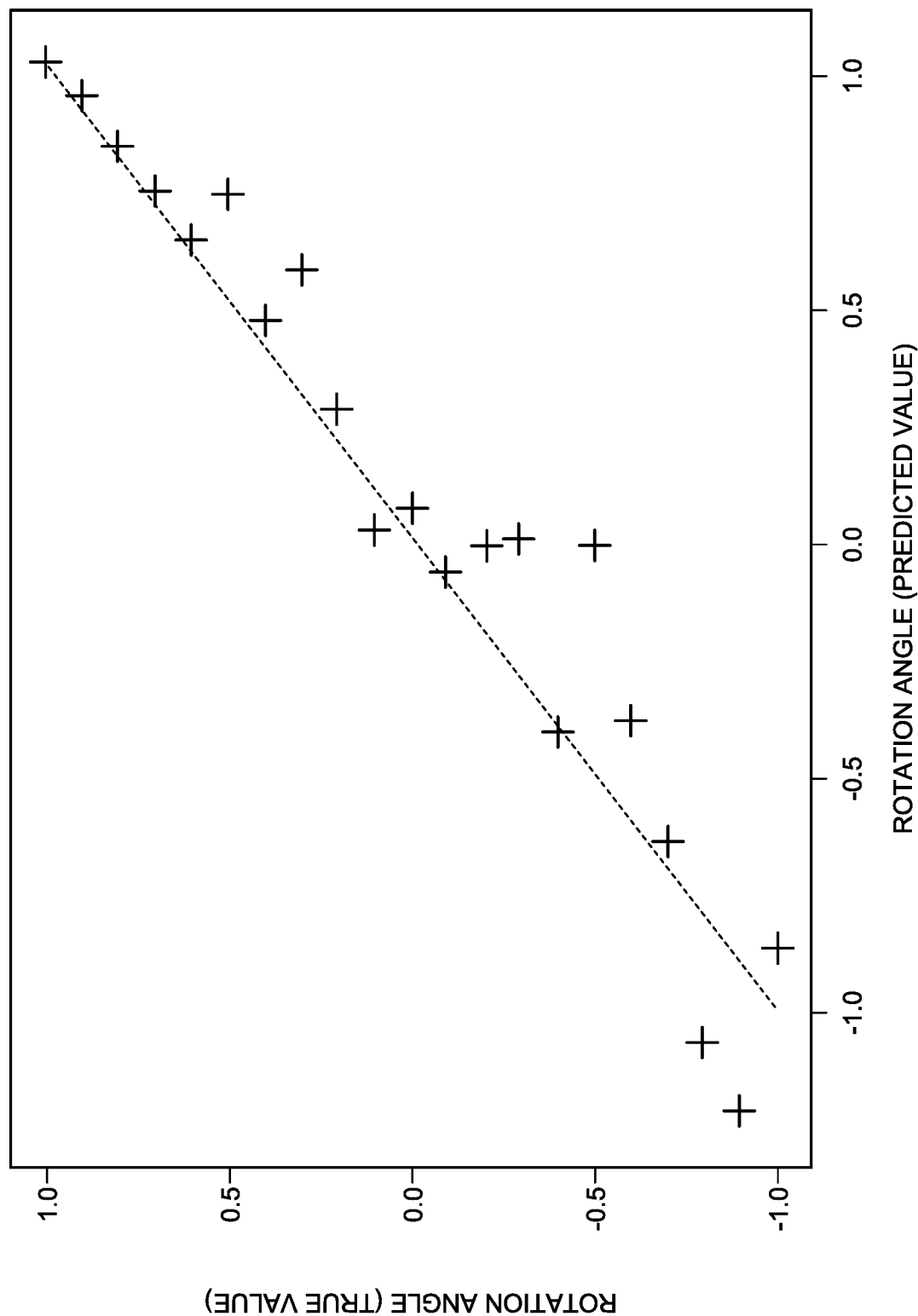
FIG. 15 is a diagram illustrating a result obtained by checking determination accuracy of a prediction model for the rotation angle of the optical fiber according to the second embodiment of the present invention.

FIG. 15 is a diagram illustrating a result obtained by checking determination accuracy of the prediction model for the rotation angle of the optical fiber according to the second embodiment of the present invention. As illustrated in FIG. 15, the rotation angle θ of the optical fiber that is determined by the prediction model 133a based on the luminance image data (that is, a predicted value of the rotation angle of the optical fiber) was substantially the same value as an actual rotation angle θ (true value) of the optical fiber. In this case, a determination error of the rotation angle θ generated by the prediction model 133a is equal to or smaller than 1°, which is within a permissible range in fusion splicing of the pair of optical fibers. The determination error of the rotation angle θ is not limited to the value equal to or smaller than 1° described above, and may be any value within a permissible range for the pair of optical fibers to be fusion-spliced.

At Step S107 in the second embodiment, the communication unit 31 of the learning processing device 130 acquires the prediction model 133a created at Step S106 described above from the prediction model creation unit 133, and transmits (provides) the acquired prediction model 133a to the fusion splicer 110 via the network 2. The communication unit 18 of the fusion splicer 110 receives the prediction model 133a via the network 2. The storage unit 12 acquires the prediction model 133a from the communication unit 18 to be stored therein. In this way, the prediction model 133a created by the prediction model creation unit 133 is disposed in the fusion splicer 110.

Fusion Splicing of Pair of Optical Fibers

Figure 16:
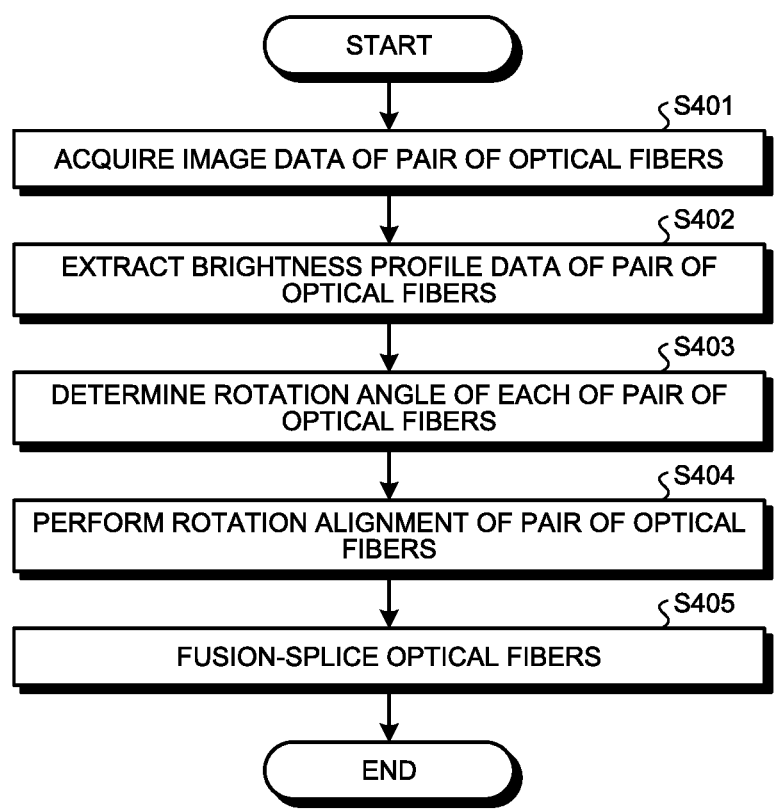
FIG. 16 is a flowchart illustrating an example of a processing procedure of fusion-splicing a pair of optical fibers as a target of fusion splicing according to the second embodiment of the present invention.

Next, the following describes a processing procedure of fusion-splicing the pair of optical fibers as a target of fusion splicing performed by the fusion splicing system 101 according to the second embodiment. FIG. 16 is a flowchart illustrating an example of a processing procedure of fusion-splicing the pair of optical fibers as a target of fusion splicing according to the second embodiment of the present invention. In the fusion splicing system 101 according to the second embodiment, through the processing steps illustrated in FIG. 16, the rotation angle θ is determined for each of the pair of optical fibers as a target of fusion splicing, rotation alignment of the pair of optical fibers is performed based on the determination result of the rotation angle θ, and the pair of optical fibers after the rotation alignment is fusion-spliced.

Specifically, as illustrated in FIG. 16, in the fusion splicing system 101, first, the imaging unit 14 acquires image data of the pair of optical fibers as a target of fusion splicing (Step S401). At Step S401, similarly to Step S201 in the first embodiment described above, the imaging unit 14 images image data in the radial direction of the pair of optical fibers set in the functional unit 11 (for example, image data in the radial direction in a state in which end faces of the one optical fiber F1 and the other optical fiber F2 are opposed to each other) based on the control by the control unit 13. In the second embodiment, the functional unit 11, the control unit 13, and the imaging unit 14 in the processing at Step S401 are included in the fusion splicer 110.

After performing Step S401, in the fusion splicing system 101, the brightness profile extracting unit 115 extracts the brightness profile data of the pair of optical fibers (Step S402). At Step S402, the brightness profile extracting unit 115 acquires, from the imaging unit 14, the image data that are imaged from the radial direction of the pair of optical fibers at Step S401 described above. The brightness profile extracting unit 115 extracts the brightness profile data indicating the brightness profile in the radial direction of the pair of optical fibers based on the image data acquired from the imaging unit 14.

In the second embodiment, the brightness profile data of the pair of optical fibers extracted at Step S402 are luminance image data indicating the brightness profile in the radial direction of the pair of optical fibers. Specifically, the brightness profile extracting unit 115 extracts, from the image data in the radial direction of the pair of optical fibers acquired from the imaging unit 14, the luminance image data indicating the brightness profile in the radial direction of the one optical fiber F1 and luminance image data indicating the brightness profile in the radial direction of the other optical fiber F2. In the second embodiment, the brightness profile extracting unit 115 in the processing at Step S402 is included in the fusion splicer 110.

After performing Step S402, in the fusion splicing system 101, the determination unit 117 determines the rotation angle θ of each of the pair of optical fibers by using the prediction model 133a described above based on the brightness profile data that are extracted based on the image data in the radial direction of the pair of optical fibers as a target of fusion splicing (Step S403).

At Step S403, the determination unit 117 reads out, from the storage unit 12, the prediction model 133a that is disposed in the fusion splicer 110 at Step S107 described above. The determination unit 117 also acquires, from the brightness profile extracting unit 115, the luminance image data of the pair of optical fibers extracted at Step S402 described above, that is, the luminance image data of each of the optical fibers F1 and F2. Thereafter, the determination unit 117 determines the rotation angle θ of the optical fiber F1 by using the prediction model 133a based on the brightness profile data (in the second embodiment, the luminance image data) of the optical fiber F1. Subsequently, the determination unit 117 determines the rotation angle θ of the optical fiber F2 by using the prediction model 133a based on the brightness profile data (in the second embodiment, the luminance image data) of the optical fiber F2. In the second embodiment, the determination unit 117 in the processing at Step S403 is included in the fusion splicer 110.

After performing Step S403, in the fusion splicing system 101, the functional unit 11 performs rotation alignment on the pair of optical fibers as a target of fusion splicing (Step S404). At Step S404, similarly to Step S205 in the first embodiment described above, the functional unit 11 performs rotation alignment on the pair of optical fibers by using the axis aligning mechanism based on the control by the control unit 13. In the second embodiment, the functional unit 11 in the processing at Step S404 is included in the fusion splicer 110.

After performing Step S404, in the fusion splicing system 101, the functional unit 11 fusion-splices the pair of optical fibers as a target of fusion splicing (Step S405), and this processing ends. At Step S405, similarly to Step S206 in the first embodiment described above, the functional unit 11 fusion-splices the pair of optical fibers after the rotation alignment at Step S404. In the second embodiment, the functional unit 11 in the processing at Step S405 is included in the fusion splicer 110.

The processing steps at Steps S101 to S107 and the processing steps at Steps S401 to S403 illustrated in FIG. 16 in the second embodiment constitute the method of determining the rotation angle of the optical fiber according to the second embodiment of the present invention. In the method of determining the rotation angle, the respective processing steps at Steps S101 to S107 in the second embodiment are performed in a case of creating the prediction model 133a for determining the rotation angle θ of the optical fiber. On the other hand, the respective processing steps at Steps S401 to S403 are performed in a case in which the rotation angle θ of each of the pair of optical fibers needs to be determined, for example, in a case of performing rotation alignment on the pair of optical fibers to be fusion-spliced.

As described above, in the second embodiment of the present invention, the number of dimensions of the luminance image data that are extracted based on the image data in the radial direction of the optical fiber is reduced, the features of the luminance image data are extracted for each rotation angle of the optical fiber, the teacher data are created to indicate the correspondence relationship between the rotation angle of the optical fiber and the restored image data that are reconstructed by performing dimension restoration of the features for each rotation angle of the optical fiber based on the features, deep learning is performed by using the teacher data, the prediction model is created to be able to determine the rotation angle of an arbitrary optical fiber based on the luminance image data of the arbitrary optical fiber, the rotation angle of each of the pair of optical fibers is determined by using the prediction model based on the luminance image data that are extracted based on the image data in the radial direction of the pair of optical fibers as a target, and other processing is the same as that in the first embodiment described above. Due to this, the same working effect as that in the first embodiment can be exhibited, and the configuration of the fusion splicer can be further simplified because the features extracting unit, which is disposed in the fusion splicer in the first embodiment, is disposed on the learning processing device.

In the first and second embodiments described above, exemplified is the fusion splicing system including a plurality of fusion splicers (the fusion splicer on the user side and the group of fusion splicers on the manufacturer side), but the present invention is not limited thereto. For example, the fusion splicing system according to the present invention may include a single fusion splicer, or may include a plurality of (two or more) fusion splicers. The single fusion splicer may be a fusion splicer on the user side, or may be a fusion splicer on the manufacturer side. Similarly, the fusion splicers may be fusion splicers on the user side, may be fusion splicers on the manufacturer side, or may be splicers including fusion splicers on the user side and fusion splicers on the manufacturer side.

In the first embodiment described above, supervised learning is performed at the time of creating the prediction model 33a for determining the rotation angle of the optical fiber, but the present invention is not limited thereto. For example, in the first embodiment, the prediction model 33a may be created by deep learning.

In the first and the second embodiments described above, exemplified is the method of determining the rotation angle for determining the rotation angle of each of the pair of optical fibers as a target of fusion splicing, but the present invention is not limited thereto. The optical fiber the rotation angle of which is determined by the method of determining the rotation angle of the optical fiber according to the present invention may be a pair of optical fibers as a target of processing other than fusion splicing, for example, butting of the end faces and the like.

In the first and second embodiments described above, exemplified is a case in which the fusion splicer communicates with the learning processing device via the network, but the present invention is not limited thereto. For example, the communication unit of the fusion splicer and the communication unit of the learning processing device may be configured to communicate with each other in a wired or wireless manner, and the fusion splicer and the learning processing device may communicate with each other without using the network. The fusion splicer may directly communicate with the learning processing device or communicate with the learning processing device via the network via a communication device different from the communication unit (for example, an information communication device such as a smartphone and a tablet device).

In the first and the second embodiments described above, rotation alignment of the pair of optical fibers is performed based on the rotation angle determined by using the prediction model, but the present invention is not limited thereto. For example, the pair of optical fibers may be roughly aligned based on the rotation angle determined by using the prediction model, and rotation alignment of the pair of optical fibers may be performed with higher accuracy based on another low-speed high-accuracy algorithm and the like as needed.

As described above, the fusion splicing system, the fusion splicer, and the method of determining the rotation angle of the optical fiber according to the present invention are preferably applied to the field of optical fibers.

The present invention is not limited to the embodiments described above. The present invention encompasses a configuration obtained by appropriately combining the constituent elements described above.

Those skilled in the art can easily conceive additional effects and modifications. Thus, a broader aspect of the present invention is not limited to the specific details and the representative embodiment as represented and described above. Accordingly, various modification can be implemented without departing from a gist or a scope of a comprehensive concept of the invention defined by the attached claims and equivalents thereof.

What is claimed is:

1. A fusion splicing system comprising:
a brightness profile extracting unit configured to extract brightness profile data indicating brightness profile in a radial direction of an optical fiber based on image data imaged from the radial direction of the optical fiber;
a features extracting unit configured to reduce the number of dimensions of the brightness profile data, thereby extracting a features of the brightness profile data for each rotation angle of the optical fiber;
a prediction model creation unit configured to perform machine learning by using teacher data indicating a correspondence relationship between a rotation angle of the optical fiber and brightness profile in the radial direction for each rotation angle of the optical fiber, the teacher data being created based on the features, and create a prediction model that is able to determine a rotation angle of an arbitrary optical fiber based on brightness profile data indicating brightness profile in the radial direction of the arbitrary optical fiber;
a determination unit configured to determine the rotation angle of each of a pair of optical fibers by using the prediction model based on the brightness profile data that are extracted by the brightness profile extracting unit based on image data in the radial direction of the pair of optical fibers as a target of fusion splicing; and
a functional unit configured to perform rotation alignment of the pair of optical fibers based on the determined rotation angle, and fusion-splice the pair of optical fibers after rotation alignment.

2. The fusion splicing system according to claim 1, wherein the brightness profile data of the pair of optical fibers are data of a luminance profile indicating brightness profile in the radial direction of the pair of optical fibers.

3. The fusion splicing system according to claim 2, wherein the teacher data are a data set indicating, for each rotation angle of the optical fiber, a correspondence relationship between the rotation angle of the optical fiber and a features of the luminance profile indicating brightness profile in the radial direction as the correspondence relationship between the rotation angle of the optical fiber and brightness profile in the radial direction.

4. The fusion splicing system according to claim 1, wherein the brightness profile data of the pair of optical fibers are luminance image data indicating brightness profile in the radial direction of the pair of optical fibers.

5. The fusion splicing system according to claim 4, wherein the teacher data are a data set indicating, for each rotation angle of the optical fiber, a correspondence relationship between the rotation angle of the optical fiber and restored image data that are reconstructed by performing dimension restoration on the features as the correspondence relationship between the rotation angle of the optical fiber and brightness profile in the radial direction.

6. The fusion splicing system according to claim 1, wherein the machine learning is deep learning.

* * * * *